United States Patent
Akiyama et al.

(10) Patent No.: US 7,743,307 B2
(45) Date of Patent: Jun. 22, 2010

(54) DEFECT INFORMATION MANAGING METHOD, INFORMATION RECORDING AND/OR REPRODUCING APPARATUS, AND INFORMATION REPRODUCING APPARATUS

(75) Inventors: Minoru Akiyama, Tokyo (JP); Hideki Takahashi, Chiba (JP); Akihito Ogawa, Kanagawa (JP); Chosaku Noda, Kanagawa (JP)

(73) Assignees: NEC Corporation, Tokyo (JP); Kabushiki Kaisha Toshiba, Tokyo (JP)

( * ) Notice: Subject to any disclaimer, the term of this patent is extended or adjusted under 35 U.S.C. 154(b) by 981 days.

(21) Appl. No.: 11/455,742

(22) Filed: Jun. 20, 2006

(65) Prior Publication Data

US 2006/0288257 A1 Dec. 21, 2006

(30) Foreign Application Priority Data

Jun. 21, 2005 (JP) ............................. 2005-180812

(51) Int. Cl.
  G06F 11/30 (2006.01)
  G06F 11/00 (2006.01)
  G11B 20/10 (2006.01)
  G11B 20/18 (2006.01)
(52) U.S. Cl. ................. 714/746; 714/42; 369/47.14; 369/47.22; 369/53.17
(58) Field of Classification Search ............ 714/42, 714/746; 369/47.14, 47.22, 53.17
See application file for complete search history.

(56) References Cited

U.S. PATENT DOCUMENTS

| 6,671,243 B2 * | 12/2003 | Ando et al. ............ 369/59.1 |
| 7,027,373 B2 * | 4/2006 | Ueda et al. ............ 369/53.15 |
| 2004/0057357 A1 | 3/2004 | Takahashi et al. |
| 2004/0257933 A1 * | 12/2004 | Takahashi ............ 369/47.14 |

FOREIGN PATENT DOCUMENTS

| EP | 1 381 047 A1 | 1/2004 |
| EP | 1 460 633 A2 | 9/2004 |
| JP | 2004-39076 A | 2/2004 |
| JP | 2004-288285 A | 10/2004 |
| JP | 2005-56542 A | 3/2005 |
| JP | 2006-59527 A | 3/2006 |
| JP | 2006-185509 A | 7/2006 |
| JP | 2006-236552 A | 9/2006 |
| JP | 2007-299526 A | 11/2007 |
| TW | 200410242 A | 6/2004 |

* cited by examiner

Primary Examiner—John J Tabone, Jr.
(74) Attorney, Agent, or Firm—Sughrue Mion, PLLC

(57) ABSTRACT

In order to select the latest defect management information, the latest selection information first is selected by searching a plurality of selection information areas for a currently active selection information area in which the latest selection information is recorded and subsequently the latest defect management information is obtained by searching a plurality of defect management areas for a currently active defect management area in which the latest defect management information is recorded. If there is no unused defect management area in which defect management information can be alternatively recorded in lieu of the currently active defect management area, recording operation is limited.

53 Claims, 20 Drawing Sheets

| | | START PSN | END PSN | NUMBER OF BLOCKS |
|---|---|---|---|---|
| | DMA MANAGER 1-1 | 2CE00 | 2CE1F | 1 |
| | RESERVED | 2CE20 | 2CE5F | 2 |
| | DMA MANAGER 2-1 | 2CE60 | 2CE7F | 1 |
| | RESERVED | 2CE80 | 2CEBF | 2 |
| | ...... | | | |
| | DMA MANAGER 10-1 | 2D160 | 2D17F | 1 |
| | RESERVED | 2D180 | 2D1BF | 2 |
| | DMA 1-1 | 2D1C0 | 2D1FF | 2 |
| | RESERVED | 2D200 | 2D21F | 1 |
| | DMA 2-1 | 2D220 | 2D25F | 2 |
| | RESERVED | 2D260 | 2D27F | 1 |
| | DMA 1-2 | 2D280 | 2D2BF | 2 |
| | RESERVED | 2D2C0 | 2D2DF | 1 |
| LEAD-IN | DMA 2-2 | 2D2E0 | 2D31F | 2 |
| | RESERVED | 2D320 | 2D33F | 1 |
| | ...... | | | |
| | DMA 1-48 | 2F500 | 2F53F | 2 |
| | RESERVED | 2F540 | 2F55F | 1 |
| | DMA 2-48 | 2F560 | 2F59F | 2 |
| | RESERVED | 2F5A0 | 2F5BF | 1 |
| | DMA 1-49 | 82CE00 | 82CE3F | 2 |
| | RESERVED | 82CE40 | 82CE5F | 1 |
| | DMA 2-49 | 82CE60 | 82CE9F | 2 |
| | RESERVED | 82CEA0 | 82CEBF | 1 |
| | ...... | | | |
| | DMA 1-100 | 82F440 | 82F47F | 2 |
| | RESERVED | 82F480 | 82F49F | 1 |
| | DMA 2-100 | 82F4A0 | 82F4DF | 2 |
| | RESERVED | 82F4E0 | 82F4FF | 1 |

FIG. 2

|  |  | START PSN | END PSN | NUMBER OF BLOCKS |
|---|---|---|---|---|
| | DMA MANAGER 1-2 | 4ED740 | 4ED75F | 1 |
| | RESERVED | 4ED760 | 4ED79F | 2 |
| | DMA MANAGER 2-2 | 4ED7A0 | 4ED7BF | 1 |
| | RESERVED | 4ED7C0 | 4ED7FF | 2 |
| | ⋯⋯ | | | |
| | DMA MANAGER 10-2 | 4EDAA0 | 4EDABF | 1 |
| | RESERVED | 4EDAC0 | 4EDAFF | 2 |
| | DMA 3-1 | 4EDB00 | 4EDB3F | 2 |
| | RESERVED | 4EDB40 | 4EDB5F | 1 |
| | DMA 4-1 | 4EDB60 | 4EDB9F | 2 |
| | RESERVED | 4EDBA0 | 4EDBBF | 1 |
| | DMA 3-2 | 4EDBC0 | 4EDBFF | 2 |
| | RESERVED | 4EDC00 | 4EDC1F | 1 |
| LEAD-OUT | DMA 4-2 | 4EDC20 | 4EDC5F | 2 |
| | RESERVED | 4EDC60 | 4EDC7F | 1 |
| | ⋯⋯ | | | |
| | DMA 3-48 | 4EFE40 | 4EFE7F | 2 |
| | RESERVED | 4EFE80 | 4EFE9F | 1 |
| | DMA 4-48 | 4EFEA0 | 4EFEDF | 2 |
| | RESERVED | 4EFEE0 | 4EFEFF | 1 |
| | DMA 3-49 | CED740 | CED75F | 2 |
| | RESERVED | CED780 | CED79F | 1 |
| | DMA 4-49 | CED7A0 | CED7DF | 2 |
| | RESERVED | CED7E0 | CED7FF | 1 |
| | ⋯⋯ | | | |
| | DMA 3-100 | CEFD80 | CEFDBF | 2 |
| | RESERVED | CEFDC0 | CEFDDF | 1 |
| | DMA 4-100 | CEFDE0 | CEFE1F | 2 |
| | RESERVED | CEFE20 | CEFE3F | 1 |

FIG. 3

| BP | CONTENTS | NUMBER OF BYTES |
|---|---|---|
| 0 TO 1 | IDENTIFIER (0010h) | 2 |
| 2 TO 3 | RESERVED | 2 |
| 4 TO 7 | DMA MANAGER UPDATE COUNTER | 4 |
| 8 TO 11 | FIRST PSN OF CURRENT DMA1 | 4 |
| 12 TO 15 | FIRST PSN OF CURRENT DMA2 | 4 |
| 16 TO 19 | FIRST PSN OF CURRENT DMA3 | 4 |
| 20 TO 23 | FIRST PSN OF CURRENT DMA4 | 4 |
| 24 TO 63 | RESERVED | 40 |

FIG. 4

| BP | CONTENTS | NUMBER OF BYTES |
|---|---|---|
| 0 TO 1 | DDS IDENTIFIER (0A0Ah) | 2 |
| 2 | RESERVED | 1 |
| 3 | DISC CERTIFICATION FLAG | 1 |
| 4 TO 7 | DDS/PDL UPDATE COUNTER | 4 |
| 8 TO 9 | NUMBER OF GROUPS | 2 |
| 10 TO 11 | NUMBER OF ZONES | 2 |
| 12 TO 79 | RESERVED | 68 |
| 80 TO 87 | LOCATION OF PRIMARY SPARE AREA | 8 |
| 88 TO 91 | LOCATION OF LSN0 | 4 |
| 92 TO 255 | RESERVED | 164 |
| 256 TO 259 | START LSN FOR ZONE0 IN A LAND | 4 |
| 260 TO 263 | START LSN FOR ZONE1 IN A LAND | 4 |
| ... | ... | ... |
| 328 TO 331 | START LSN FOR ZONE18 IN A LAND | 4 |
| 332 TO 335 | START LSN FOR ZONE0 IN A GROOVE | 4 |
| 336 TO 339 | START LSN FOR ZONE1 IN A GROOVE | 4 |
| ... | ... | ... |
| 404 TO 407 | START LSN FOR ZONE18 IN A GROOVE | 4 |
| 408 TO 2047 | RESERVED | 1640 |
| 2048 TO 2049 | PDL IDENTIFIER (0001h) | 2 |
| 2050 TO 2051 | NUMBER OF ENTRIES IN PDL | 2 |
| 2052 TO 2055 | THE FIRST PDL ENTRY | 4 |
| 2056 TO 2059 | THE SECOND PDL ENTRY | 4 |
| ... | ... | ... |
| Np TO (Np+3) | THE LAST PDL ENTRY | 4 |
| (Np+3) TO 65535 | UNUSED (FFh) | |

LSN:LOGICAL SECTOR NUMBER
Np=4 × (NUMBER OF ENTRIES IN PDL)

FIG. 5

| BP | CONTENTS | NUMBER OF BYTES |
|---|---|---|
| 0 TO 1 | SDL IDENTIFIER (0002h) | 2 |
| 2 TO 3 | RESERVED | 2 |
| 4 TO 7 | SDL UPDATE COUNTER | 4 |
| 8 TO 11 | START PSN OF SUPPLEMENTARY SPARE AREA | 4 |
| 12 TO 15 | TOTAL NUMBER OF LOGICAL SECTORS | 4 |
| 16 TO 19 | DDS/PDL UPDATE COUNTER | 4 |
| 20 | SPARE AREA FULL FLAGS | 1 |
| 21 | RESERVED | 1 |
| 22 TO 23 | NUMBER OF ENTRIES IN SDL | 2 |
| 24 TO 31 | THE FIRST SDL ENTRY | 8 |
| ... | ... | ... |
| Ns TO (Ns+7) | THE LAST SDL ENTRY | 8 |
| (Ns+8) TO 65535 | UNUSED (FFh) | |

Ns=4 × (NUMBER OF ENTRIES IN SDL)

FIG. 6

DEFECT INFORMATION MANAGING METHOD, INFORMATION RECORDING AND/OR REPRODUCING APPARATUS, AND INFORMATION REPRODUCING APPARATUS

CROSS-REFERENCE TO RELATED APPLICATIONS

This application is based upon and claims the benefit of priority from prior Japanese Patent Application No. 2005-180812, filed Jun. 21, 2005, the entire contents of which are incorporated herein by reference.

BACKGROUND OF THE INVENTION

1. Field of the Invention

The present invention relates to a defect information managing method of managing defect management information recorded in a defect management area in an information recording medium such as an optical disc medium comprising the detect management area. The present invention also relates to an information recording and/or reproducing apparatus for using the information recording medium comprising the defect management area. The present invention further relates to an information reproducing apparatus for using the information recording medium comprising the defect management area.

2. Description of the Related Background Art

An information recording or storage medium such as an optical disc medium of a type has a user area for storing user data and a reserved spare area. The optical disc medium of the type described has a defect area occurring in the user data area. An information recording and/or reproducing apparatus for using the optical disc medium carries out a replacement process for replacing the above-mentioned defect area into a wholesome area in the spare area. Defect management information related to the replacement process is stored in an area which is called a defect management area (DMA). High reliability is required to the DMA.

Replacement information is added to the defect management information every time the replacement occurs and it is necessary to renew or update the defect management information to be recorded in the DMA. A frequency of rewriting or updating the defect management information in the DMA is relatively high. Among information recording media, a DVD-RAM allows 100,000 or more times rewriting for the DMA. In addition, the high reliability is ensured by recording a set of the defect management information having the same contents in four locations of the DMA. On the other hand, in the information recording medium having a low level of resistant to the rewriting, measures are proposed, for example, in Japanese Unexamined Patent Publications Tokkai Nos. 2004-39076 and 2004-288285, namely, JP2004-39076A and JP2004-288285A which will hereinafter be called first and second prior art documents, respectively. The first and the second prior art documents correspond to United States Patent Application Publication Nos. 2004/0057357 and 2004/0257933, namely, US2004/0057357 A1 and US2004/0257933 A1, respectively.

In the first prior art document, an information storage or recording medium comprises first through M-th DMA sequences each of which comprises first through N-th DMAs, where M represents a first positive integer which is not less than two and N represents a second positive integer which is not less than two. The first positive integer M may be equal to four while the second positive integer N may be equal to one hundred. Herein, n-th DMAs in the first through the M-th DMA sequences are collectively called an n-th DMA set, where n represents a variable between one and N, both inclusive. The first through the N-th DMA sets are collectively called a group of DMA sets. In the group of DMA sets, one of the first through the N-th DMA sets is used as a currently active DMA set. A set of the latest defect management information is always stored in the currently active DMA set. That is, it will be assumed that the currently active DMA set is the n-th DMA set. In this event, the latest defect management information is stored in the n-th DMAs of the first through the M-th DMA sequences. Reliability with respect to the defect management information is ensured by using a different DMA set (e.g., an (n+1)-th DMA set) in the group of DMA sets when the currently active DMA set (e.g., the n-th DMA set) degenerates caused by repetition of the rewriting into a defective one.

More specifically, in order to improve the fault tolerance of DMAs, when the currently active DMA set has weakened, a set of the latest defect management information stored in the currently active DMA set (the n-th DMA set) is shifted to a new DMA set (the (n+1)-th DMA set). It is determined that the currently active DMA set has weakened when the overwrite count for the currently active DMA set approaches an allowable overwrite count of media having the group of DMA sets, or when defects on the currently active DMA set increase to result in more likely failing error correction for the currently active DMA set.

The DMA has a size of an integer multiple of that an ECC (error correction code) block as a true recording unit in a drive. On the DVD-RAM, one ECC block consists of sixteen sectors, and the ECC block has a size of thirty-two KB. Each DMA is made up of a DDS/PDL ECC block and a SDL ECC block, "PDL" is an abbreviation for Primary Defect List while "SDL" is an abbreviation of Secondary Defect List. The PDL is a list for registering primary defect information indicative of primary defects while the SDL is a list for registering secondary defect information indicative of secondary defects. Specifically, the PDL registers the primary detect information associated with the primary detects found in certification executed upon formatting a medium. In comparison with the PDL, the SDL registers the secondary detect information associated with the secondary defects found upon normal recording (e.g., upon recoding user data). The defect management information includes a replacement source address and a replacement destination address. In each of the first through the M-th DMA sequences, the first through the N-th DMAs are sequentially allocated and one of the first through the N-th DMAs is used as the currently active DMA in turn from the first DMA to the N-th DMA in ascending order. In other words, one of the first through the N-th DMA sets is used as the currently active DMA set in turn from the first DMA set to the N-th DMA set in ascending order.

More specifically, the information storage or recording medium comprises the first through the M-th DMA sequences each of which comprises the first through the N-th DMAs, in the manner which is described above. In other words, each of the first through the M-th DMA sequences comprises N DMAs from the first DMA to the N-th DMA. The first through the N-th DMAs in the first through the M-th DMA sequences are collectively called the first through the N-th DMA sets, respectively. The first through the N-th DMA sets are collectively called the group of the DMA sets. If the first DMA set is used as a currently active DMA set, the second through the N-th DMA sets are auxiliary or backup ones.

The first through the N-th DMA sets are used in turn from the first DMA set to the N-th DMA set in ascending order. In an initial state, the first DMA set is used as the currently active one and the second through the N-th DMA sets are not used or backup ones. When detects on the first DMA set increase or when the overwrite count has exceeded a prescribed value, the first DMA set is changed from the currently active one to a used one, and a set of the latest defect management information stored in the first DMA set is replaced to and recorded on the second DMA set. Likewise, using the third through the N-th DMA sets in turn, even when each DMA set has suffered detects or overwrite damages, the information storage or recording medium can be continuously used without breaking down as a system.

On the other hand, in the second prior art document, an information storage or recording medium comprises not only the group of DMA sets but also a group of selection information area (SIA) sets for recording selection information indicative of a location or an address of the currently active DMA set in the group of DMA sets in which a set of the latest defect management information is stored. In addition, the second prior art document discloses a method of specifying, in a short time, the currently active DMA set in which a set of the latest detect management information is stored.

Specifically, the selection information is called a DMA manager in the second prior art document. The selection information area (SIA) is called a manager storage area in the second prior art document. The second prior art document discloses an information storage or recording medium comprising a rewritable area, which comprises first through M-th DMA sequences, first through P-th manager storage area sequences (SIA sequences), and a user area, where P represents a third positive integer which is not less than two. Each of the first through P-th SIA sequences stores identical selection information. As a result, the fault tolerance of the SIAs can be improved. The first positive integer M may be equal to four while the third positive integer P may be equal to two.

More specifically, the first and the second DMA sequences are allocated on a lead-in area on the innermost periphery of the information storage or recording medium while the third and the fourth DMA sequences are allocated on a lead-out area on the outermost periphery of the information storage or recording medium. Each of the first through the fourth DMA sequences comprises first through N-th DMA reserved areas. The first through the N-th DMA reserved areas correspond to the first through the N-th DMAs of the information storage or recording medium disclosed in the above-mentioned first prior art document, respectively. Herein, n-th DMA reserved areas in the first through the fourth DMA sequences are collectively called an n-th DMA set. In an initial state, each of the first DMA reserved areas (the first DMA set) contained the respective DMA sequences stores current (the latest) defect management information. If the first DMA reserved area contained in an arbitrary DMA sequence (e.g., the first DMA sequence) falls under a defective area, a set of the defect management information stored in the first DMA set is transferred to the second DMA set.

As described above, on the information storage or recording medium disclosed in the second prior art document, currently active DMA reserved areas change or transit. Based on this, the second prior art document introduces the DMA manager used to quickly search the first through the N-th DMA sets for the currently active DMA set. That is, the information storage or recording medium disclosed in the second prior art document comprises the first through the P-th manager storage areas (SIAs) for storing DMA managers (selection information). Each DMA manager manages the addresses of the currently active DMA reserved areas or the currently active DMA set. In other words, each manager storage area is a location information area for storing the location information of the currently active DMA reserved areas.

It will be assumed that the third positive integer P is equal to two. In this event, the first manager storage area sequence is located on the lead-in area while the second manager storage area sequence is located on the lead-out area. Each of the first and the second manager storage area sequences stores identical location information. Each of the first and the second manager storage area sequences comprises first through K-th manager reserved areas, where K represents a fourth positive integer which is not less than two. This is to take a measure against defects of the DMA manager. The fourth positive integer K may be equal to ten.

In other words, in the second prior art document, the information storage or recording medium comprises the plurality of SIAs as well as the plurality of DMAs. The information storage or recording medium comprises first through P-th SIA sequences each of which comprises first through K-th SIAs. The first through the P-th SIA sequences correspond to the first through the P-th manager storage area sequences, respectively. The first through the K-th SIAs correspond to the first through K-th manager reserved areas, respectively. Herein, k-th SIAs in the first through the P-th SIA sequences are collectively called a k-th SIA set, where k represents a variable between one and K, both inclusive. The first through the K-th SIA sets collectively called a group of SIA sets. In the group of SIA sets, one of the first through the K-th SIA sets is used as a currently active SIA set. A set of the latest selection information (a set of latest DMA managers) is always stored in the currently active SIA set. That is, it will be assumed that the currently active SIA set comprises the k-th SIA set. In this event, a set of the latest selection information (a set of the latest DMA managers) is stored in the k-th SIAs of the first through P-th SIA sequences. Reliability with respect to the selection information (a set of the DMA managers) is ensured by using a different SIA set (e.g., a (k+1)-th SIA set) in the group of SIA sets when the currently active SIA set (e.g., the k-th SIA set) degenerates caused by repetition of the rewriting into a defective one.

More specifically, in order to improve the fault tolerance of SIAs, when the currently active SIA set has weakened, a set of the latest selection information (a set of the latest DMA managers) stored in the currently active SIA set (the k-th SIA set) is shifted to a new SIA set (the (k+1)-th SIA set).

In the initial stage, the first manager reserved areas contained in the respective manager storage area sequences store a set of the location information indicative of locations of the currently active DMA reserved areas or the currently active DMA set. As a result of overwrite accesses, when the first manager reserved area contained in a given manager storage area sequence (e.g., the first manager storage area sequence) falls under a defective area, all pieces of location information stored in the first manager reserved areas of the first and the second manager storage area sequences are changed (transferred) to the second manager reserved areas of the first and the second manager storage area sequences. At any rate, the DMA manager manages the addresses of the currently active four DMA reserved areas.

More specifically, in the initial state, the latest DMA managers are stored in the first manager reserved areas of the respective manager storage area sequences. When one or more of the first manager reserved areas in the manager storage area sequences fall under defective areas, the latest DMA managers are transited to the second manager reserved areas in the manager storage area sequences. Likewise, transition of the DMA managers is made in turn. When the DMA managers reach the K-th manager reserved areas in the manager storage area sequences, the recording operation is inhibited.

It is assumed that the information storage or recording medium disclosed in the second prior art document allows up to 1000 overwrite accesses. In addition, it is assumed that on this information storage or recording medium, registration of 10000 cases of defect management information is realized. Under the circumstances, in this case, if DMAs are transited every 1000 accesses, the medium can proof registration of 10000 cases of defect management information by 10 (=10000/1000) transitions in principle. That is, by allowing the DMA replacement process, poor overwrite characteristics can be overcome.

The second prior art document also discloses the information recording and/or reproducing apparatus which supports both a table lookup scheme and an incremental scheme as a scheme for searching for the currently active DMAs. The table lookup scheme searches for the currently active DMAs based on the DMA managers. If the DMA managers cannot be read out, the currently active DMAs are searched by the incremental scheme. The incremental scheme checks all DMA reserved areas contained in the DMAs in turn to search for the currently active DMAs. In other words, the incremental scheme is used as recovery of the table lookup scheme if the table lookup scheme fails.

At first, the currently active DMA reserved areas are searched by the table lookup scheme. That is, if location information indicative of the currently active DMA reserved areas can be read out from the latest DMA manager areas, the currently active DMA reserved areas can be found out. If any currently active DMA reserved areas cannot be found by the table lookup scheme, the currently active DMA reserved areas are searched by the incremental scheme.

However, the second prior art document neither discloses nor teaches how to search for the currently active SIA set in which a set of the latest selection information (a set of the latest DMA managers) is stored. More specifically, it will be assumed that a plurality of DMA manager sets (a plurality of pieces of selection information) are stored in the group of SIA sets. In this event, the second prior art document dose not establish a procedure for selecting the latest selection information by searching for the currently active SIA set and a method of using the latest selection information. In addition, it will be assumed that there is no unassigned or future-usable DMA set in lieu of the currently active DMA set. Under the circumstances, it is impossible to avoid to fall into a situation where the defect management information cannot be extract caused by degradation of an active DMA set in the first and the second prior art documents. Furthermore, each of the first and the second prior art documents neither discloses nor teaches decision criteria for changing the currently active DMA manager set (the currently active SIA set) into a different DMA manager set (different SIA set) when contents of the currently active DMA manager set are renewed.

In addition, Japanese Unexamined Patent Publication Tokkai No. 2005-56542, namely, JP2005-56542A (which will hereinafter be called third prior art document) discloses a write-once information storage or recording medium permitting to easily search for the latest DDS and the latest defect list. Disclosed in the third prior art document, the write-one information storage or recording medium comprises a lead-in area, a data area, and a lead-out area. The lead-in area comprises first and second defect management areas and a group of defect management work areas. The data area includes a user data area and a spare area. The lead-out area comprises third and fourth defect management areas. The group of defect management work areas comprises a plurality of defect management work areas. Each defect management work area is an area for temporality recording defect management information renewed or updated before the write-one information storage is finalized. On the defect management work area, a disc definition structure (DDS) and a defect list are arranged. The latest defect list and the latest DDS are located in a recorded defect management work area contiguous to the boundary of recorded defect management areas and unrecorded defect management areas in order of the latest defect list and the latest DDS along a predetermined direction.

However, the third prior art document neither discloses nor teaches a selection information area (a DMA manager area) for storing selection information (a DMA manager) for specifying a location of the currently active DMA in which the latest defect management information is stored.

SUMMARY OF THE INVENTION

It is therefore an object of the present invention to provide a defect information managing method which is capable of extracting a latest defect management information with reliability in a short time.

It is another object of the present invention to provide a defect information managing method which is capable of ensuring reliability of an active DMA set in a situation where there is no unassigned or future-usable DMA set in lieu of a currently active DMA set.

It is still another object of the present invention to provide a defect information managing method which is capable of ensuring selection information having high reliability by establishing alternation criteria of DMA manager sets on renewing data of the DMA manager sets.

According to one aspect of this invention, there is provided a method of managing defect management information stored in an information recording medium. The information recording medium comprises a user area for storing user data, a plurality of defect management areas each of which enables to record defect management information on the user area, and a plurality of selection information areas each of which enables to record selection information including location information indicative of a location of a currently active defect management area in which the latest defect management information is recorded. The method includes the step of selecting the latest selection information by searching the plurality of selection information areas for a currently active selection area in which the latest selection information is recorded. On the basis of the latest selection information, the plurality of defect management areas for the currently active defect management area is searched.

According to another aspect of this invention, there is provided a recording and/or reproducing apparatus for recording and/or reproducing data in/from an information recording medium. The information recording medium comprises a user area for storing user data, a plurality of defect management areas each of which enables to record defect management information related to at least one defect on the user area, and a plurality of selection information areas each of which enables to record selection information including location information indicative of a location of a currently active defect management area in which the latest defect management information is recorded. The apparatus comprises selecting means for selecting the latest selection information by searching the plurality of selection information areas for a currently active selection area in which the latest selection information is recorded. The apparatus further comprises searching means for searching, on the basis of the latest selection information, the plurality of defect management areas for the currently active defect management area.

According to still another aspect of this invention, there is provided a reproducing apparatus for reproducing data from an information recording medium. The information recording medium comprises a user area for storing user data, a plurality of defect management areas each of which enables to record defect management information related to at least one defect on said user area, and a plurality of selection information areas each of which enables to record selection information including location information indicative of a location of a currently active defect management area in which the latest defect management information is recorded. The apparatus comprises selecting means for selecting the latest selection information by searching said plurality of selection information areas for a currently active selection area in which the latest selection information is recorded. The apparatus further comprises searching means for searching, on the basis of the latest selection information, said plurality of defect management areas for the currently active defect management area.

BRIEF DESCRIPTION OF THE DRAWINGS

FIG. 2 shows the allocation of the first SIA sequences and the first and the second DMA sequences.

FIG. 3 shows the allocation of the second SIA sequence and the third and the fourth DMA sequences.

FIG. 4 shows an example of data structure of an information unit of 64 bytes which comprises one element of the selection information (the DMA manager) on the information recording medium (the optical disc medium).

FIG. 5 is an example of data structure of DDS/PDL data recorded in the DMA on the information recording medium (the optical disc medium) illustrated in FIG. 1.

FIG. 6 is an example of data structure of the SDL data recorded in the DMA on the information recording medium (the optical disc medium) illustrated in FIG. 1.

DESCRIPTION OF THE PREFERRED EMBODIMENTS

Figure 1:
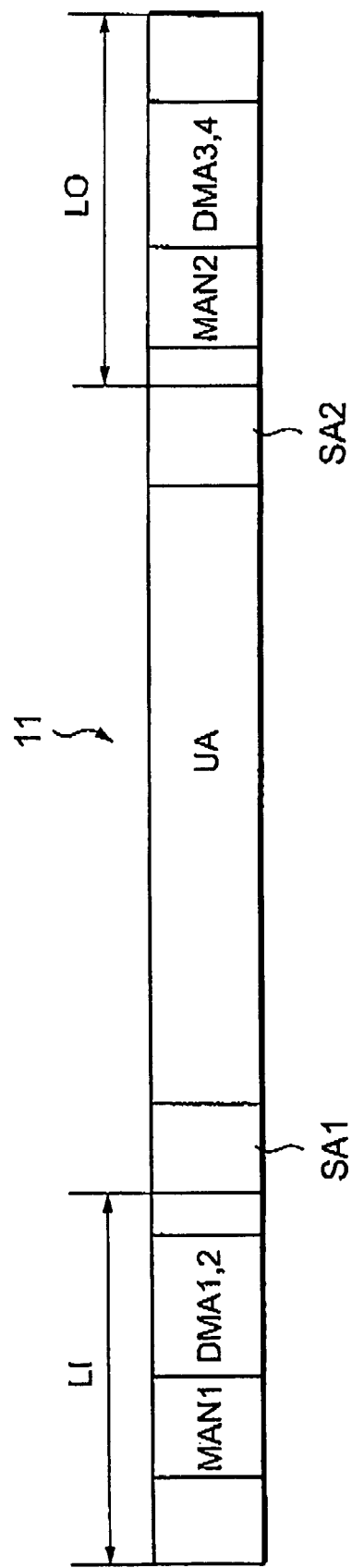
FIG. 1 is a schematic view of data structure showing an example of an information recording medium for use in a defect information managing method according to this invention.

Now, an embodiment of this invention will be described with reference to figures in detailed, FIG. 1 is a schematic view of data structure showing an example of an information recording medium 11 for use in a defect information managing method according to this invention.

The illustrated information recording medium 11 is an optical disc medium enable to record and/or reproduce data therein/therefrom. The information recording medium 11 has a data structure which comprises a user area UA and first and second spare areas SA1 and SA2 which are sandwiched between a lead-in area LI and a lead-out area LO.

The user area UA is used to store user data. Each of the spare areas SA1 and SA2 is an area where data to be recorded on a defective area present within the user area UA is replacement-recorded. The defective area is an area for respective ECC (error collection code) blocks. That is, data for respective ECC blocks is replacement-recorded on the first and the second spare areas SA1 and SA2.

The information recording medium 11 comprises a group of DMA (defect management area) sets and a group of SIA (selection information area) sets in the manner which will becomes clear as the description proceeds.

Figure 7:
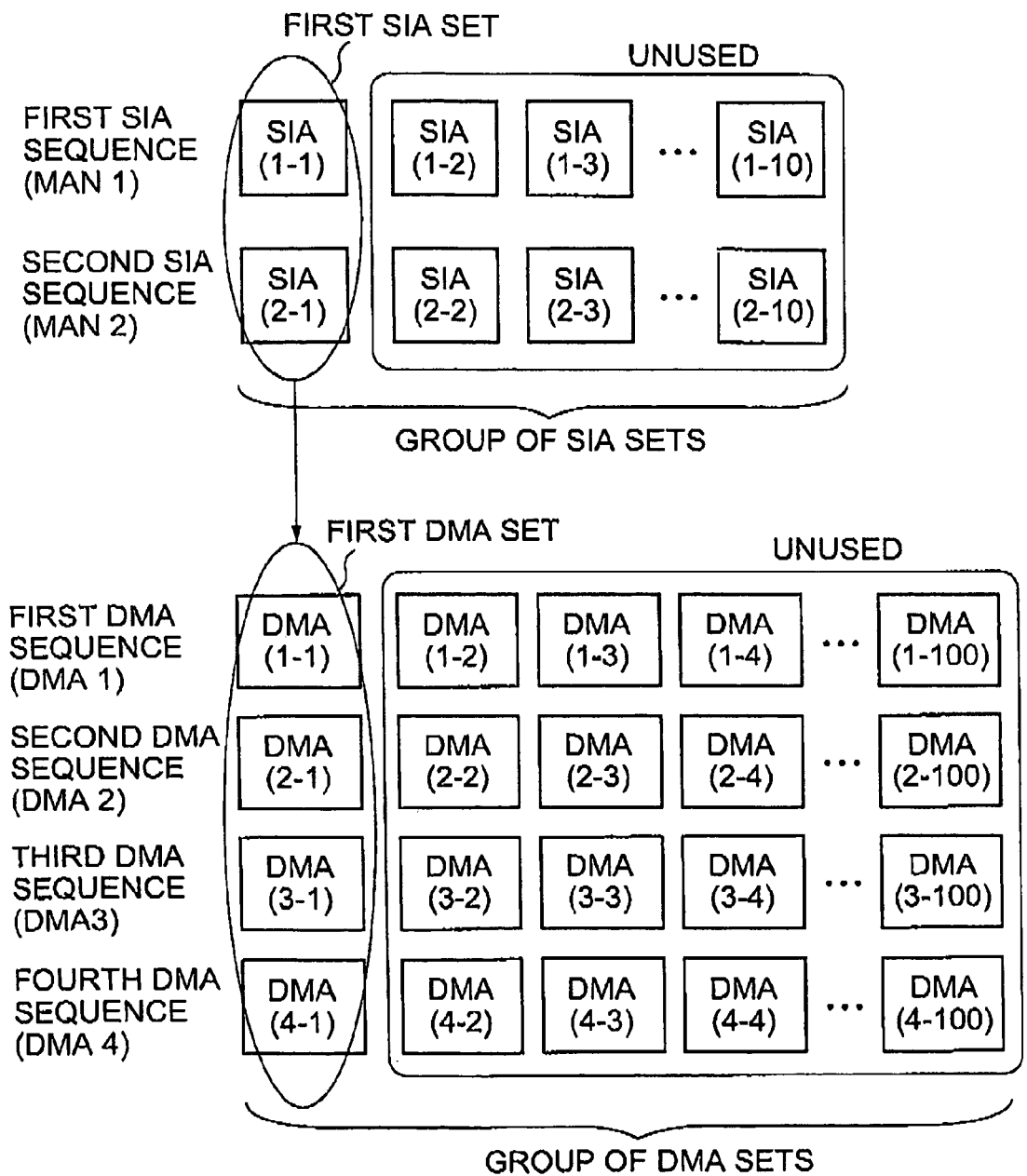
FIG. 7 shows an initial or first state of DMA sets and SIA sets immediately after initializing the information recording medium (the optical disc medium).

The information recording medium 11 comprises first through M-th DMA sequences, where M represents a first positive integer which is not less than two. In the example being illustrated, the first positive integer M is equal to four. Each of the first through the M-th DMA sequences comprises first through N-th DMAs, where N represents a second positive integer which is not less than two. In the example being illustrated, the second positive integer N is equal to one hundred as illustrated in FIG. 7. Each of the first through the N-th DMAs is an area for enabling to record defect management information therein. Herein, n-th DMAs in the first through the M-th DMA sequences are collectively called an n-th DMA set, where n represents a variable between one and N, both inclusive. The first through the N-th DMA sets are collectively called the group of DMA sets. In the group of DMA sets, one of first through N-th DMA sets is used as a currently active DMA set, in the manner which will later be described. A set of the latest defect management information is always stored in the currently active DMA set.

In FIG. 1, the first and the second DMA sequences are collectively depicted at DMA1, 2 while the third and the fourth DMA sequences are collectively depicted ad DMA3, 4. The first and the second DMA sequences DMA1, 2 are allocated on the lead-in area LI on the innermost periphery of the information recording medium 11. The third and the fourth DMA sequences DMA3, 4 are allocated on the lead-out area LO on the outermost periphery of the information recording medium 11. If the first DMA set is used as the currently active DMA set, the second through the N-th DMA sets are auxiliary or backup ones.

The first through the N-th DMA sets are used in turn from the first DMA set to the N-th DMA set in ascending order. In an initial state, the first DMA set is used as the currently active one and the second through the N-th DMA sets are not used or backup ones. When defects on the first DMA set increase or when the overwrite count has exceeded a prescribe value, the first DMA set is changed from the currently active one to a used one, and a set of the latest detect management information stored in the first DMA set is replaced to and recorded on the second DMA set. Likewise, using the third through the N-th DMA sets in turn, even when each DMA set has suffered defects or overwrite damages, the information recording medium 11 can be continuously used without breaking down as a system.

On the other hand, the group of SIA sets is for recording selection information indicative of a location or an address of the currently active DMA set in which a set of the latest defect management information is stored. The selection information includes location information indicative of the location of the currently active DMA set and history information indicative of updating of the selection information. The history information is, for example, updated count data which is counted up every updating of the selection information. The selection information is called a DMA manager.

The information recording medium 11 further comprises first through P-th SIA sequences, where P represents a third positive integer which is not less than two. In the example being illustrated, the third positive integer is equal to two. That is, the information recording medium 11 comprises the first and second SIA sequences MAN1 and MAN2 as shown in FIG. 1. The first SIA sequences MAN1 is located in the lead-in area LI while the second SIA sequences MAN2 is located in the lead-out area LO. Each of the first and the second SIA sequences MAN1 and MAN2 stores identical selection information. Each of the first and the second SIA sequences MAN1 and MAN2 comprises first through K-th SIAs, where K represents a fourth positive integer which is no less than two. In the example being illustrated, the fourth positive integer K is equal to ten as illustrated in FIG. 7. Herein, k-th SIAs in the first and the second SIA sequences are collectively called a k-th SIA set, where k represents a variable between one and K, both inclusive. The first through the K-th SIA sets are collectively called the group of SIA sets. In the group of SIA sets, one of the first through the K-th SIA sets is used as a currently active SIA set. A set of the latest selection Information (latest DMA manager set) is always stored in the currently active SIA set.

The first through the K-th SIA sets are used in turn from the first SIA set to the K-th SIA set in ascending order. In an initial state, the first SIA set is used as the currently active one the second through the K-th SIA sets are not used or backup ones. When one or more the first SIAs in the first through the P-th SIA sequences fall under detective areas, a set of the latest selection information is transited to the second SIA set. Likewise, transition of the set of the latest selection information is made in turn.

More specifically, data of the information recording medium (the optical disc medium) 11 is blocked into data blocks each having 64 Kbytes, ECC (Error Collection Code) or the like is added to each data block in a predetermined processing procedure, and the data are successively recorded to the optical disc medium every data block. On reproduction of data from the optical disc medium, the data blocks are successively read out of the information recording medium (the optical disc medium) 11 every block having 64 Kbytes with error collection carried out for each data block. The data block is called ECC block.

FIGS. 2 and 3 collectively show an example of the allocation of the first and the second SIA sequences MAN1 and MAN2 and the first through the fourth DMA sequences DMA1, 2 and DMA3, 4. FIG. 2 shows the allocation of the first SIA sequences MAN1 and the first and the second DMA sequences DMA1, 2 while FIG. 3 shows the allocation of the second SIA sequence MAN2 and the third and the fourth DMA sequences DMA3, 4. The information recording medium (the optical disc medium) 11 is assigned with physical sector numbers (PSNs) which are given in hexadecimal depicted at suffix of h.

The first SIA sequence MAN1 corresponds to an area where the physical sector number (PSN) lies in a range between 2CE00h and 2D1BFh. The first and the second DMA sequences DMA1, 2 correspond to an area where the physical sector number (PSN) lies in a range between 2D1C0h and 2F5BFn and a range between 82CE00h and 82F4FFh. The second SIA sequence MAN2 corresponds to an area where the physical sector number (PSN) lies in a range between 4ED740h to 4EDAFFh. The third and the fourth DMA sequences DMA3, 4 correspond to an area where the physical sector number (PSN) lies in a range between 4EDB00h and 4EFEFFh and a range between CED740h and CEFE3Fh. One ECC block corresponds to thirty-two sectors. Accordingly, the physical sector number (PSN) is incremented by 20h when the ECC block is incremented by one.

In the illustrated information recording medium (optical disc medium) 11, each selection information area (SIA) or each DMA manager area is recorded with one ECC block and each defect management area (DMA) is recorded with two ECC blocks which consists of an ECC block called a DDS/PDL block and an ECC block called a SDL block. In the example being illustrated, the group of SIA sets comprises the first through the tenth SIA sets while the group of DMA sets comprises the first through the hundredth DMA sets. In other words, the group of SIA sets enables to be recorded with ten sets of the selection information or ten DMA manager sets while the group of DMA sets enables to be recorded with one hundred sets of the defect management information. A k-th SIA set #k consists of a k-th SIA SIA(1-k) of the first SIA sequence MAN1 and a k-th SIA SIA(2-k) of the second SIA sequence MAN2, where k is a variable between one and K or ten, both inclusive. An n-th DMA set #n consists of an n-th DMA DMA(1-n) of the first DMA sequence, an n-th DMA DMA(2-n) of the second DMA sequence, an n-th DMA DMA(3-n) of the third DMA sequence, and an n-th DMA DMA(4-n) of the fourth DMA sequence, where n represents a variable between one and N (one hundred).

FIG. 4 shows an example of data structure of an information unit of 64 bytes which comprises one element of the selection information (the DMA manager) on the information recording medium (the optical disc medium) 11.

The selection information (the DMA manager) comprises data structure where the information unit of 64 bytes illustrated in FIG. 4 is repeated 1024 times. In other words, the selection information (the DMA manager) consists of 1024 information units. The information unit includes an Identifier (0010h) and four first PSNs for four DMAs as location information of an active DMA set. The information unit further includes a DMA manager update counter which is an area for storing a counted value of an update number at a byte position of 4 to 7. The counted value (the update number) of the DMA manager update counter is initialized to 00h on initializing the information recording medium (the optical disc medium) 11 and is incremented by one every updating of contents of the DMA manager (the selection information). Accordingly, it is possible to decide that the DMA manager (the selection information) having the largest value of the DMA manager update counter is the latest one.

FIG. 5 is an example of data structure of DDS/PDL data recorded in the DMA on the information recording medium (the optical disc medium) 11 illustrated in FIG. 1.

The DDS/PDL data comprises a DDS Identifier (0A0Ah), a PDL Identifier (0001h), a group of PDL entries, a DDS/PDL Update Counter, and so on. The DDS/PDL Update Counter is an area for storing counted data of a update count. The counted data (the update count) of the DDS/PDL Update Counter is initialized to 00h on initializing the optical disc medium 11 and is incremented by one every updating the contents of DDS/PDL data. The PDL is recorded with defect location information and is used in a slip replacement. The DDS/PDL data is changed only on initializing or on re-initializing.

FIG. 6 is an example of data structure of the SDL data recorded in the DMA on the information recording medium (the optical disc medium) 11 illustrated in FIG. 1.

The SDL data comprises a SDL Identifier (002h), a group of SDL entries, a DDS/PDL Update Counter, a SDL Update Counter, and so on. The DDS/PDL Update Counter is an area for storing the update count on recording SDL. The SDL Update Counter is an area for storing an update count of the SDL. A counted value (an update count) of the SDL Update Counter is initialized to 00h on initializing the optical disc medium 11 and is incremented by one every updating the contents of the SDL. The SDL is recorded with defect location information and replacement destination location information and is used in a linear replacement. The SDL data is used for recoding defects found on normal use after initialization or re-initialization comes to end.

Figure 8:
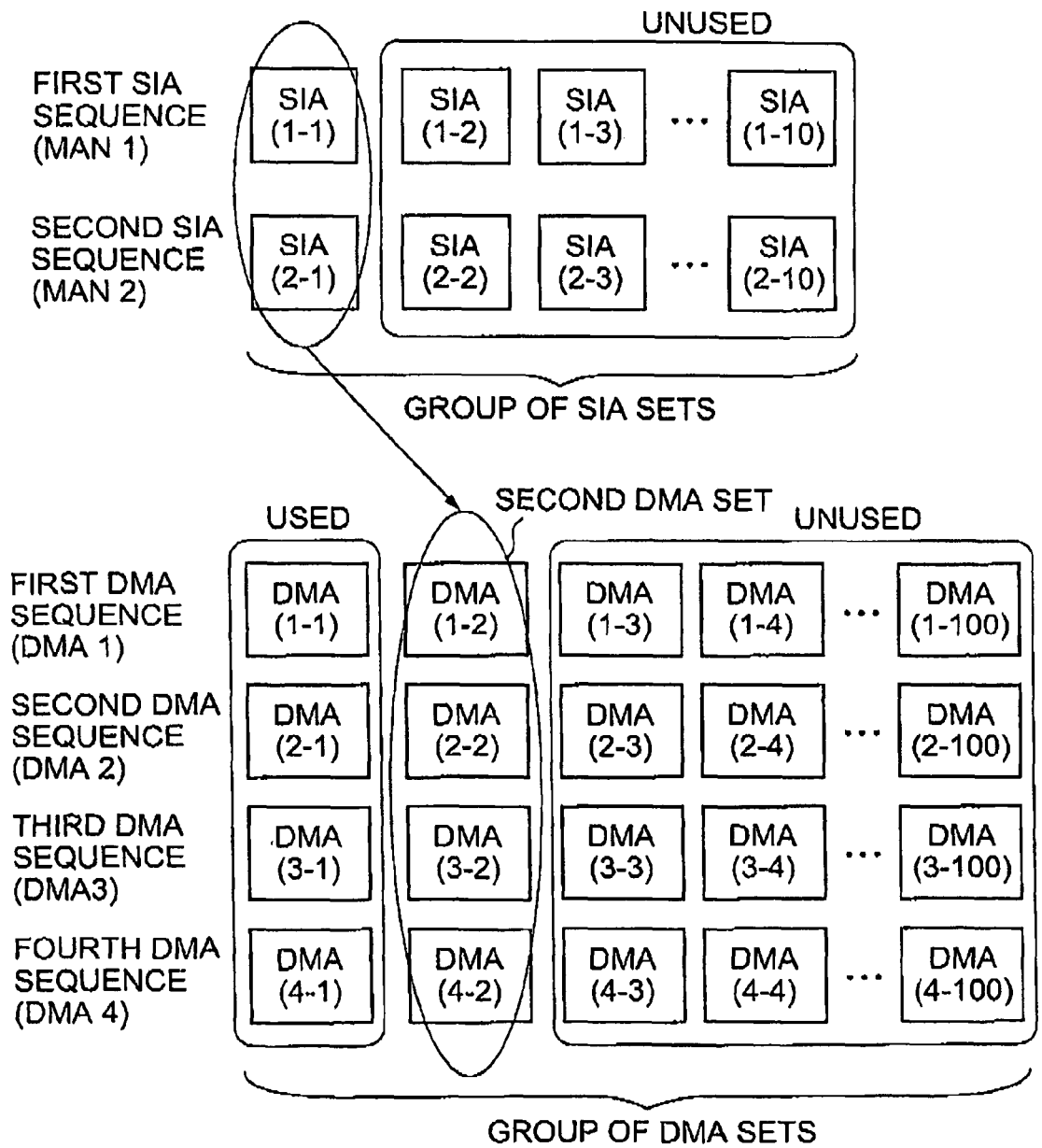
FIG. 8 shows a second state of the DMA sets and the SIA sets when the information recording medium (the optical disc medium) is in use.
Figure 9:
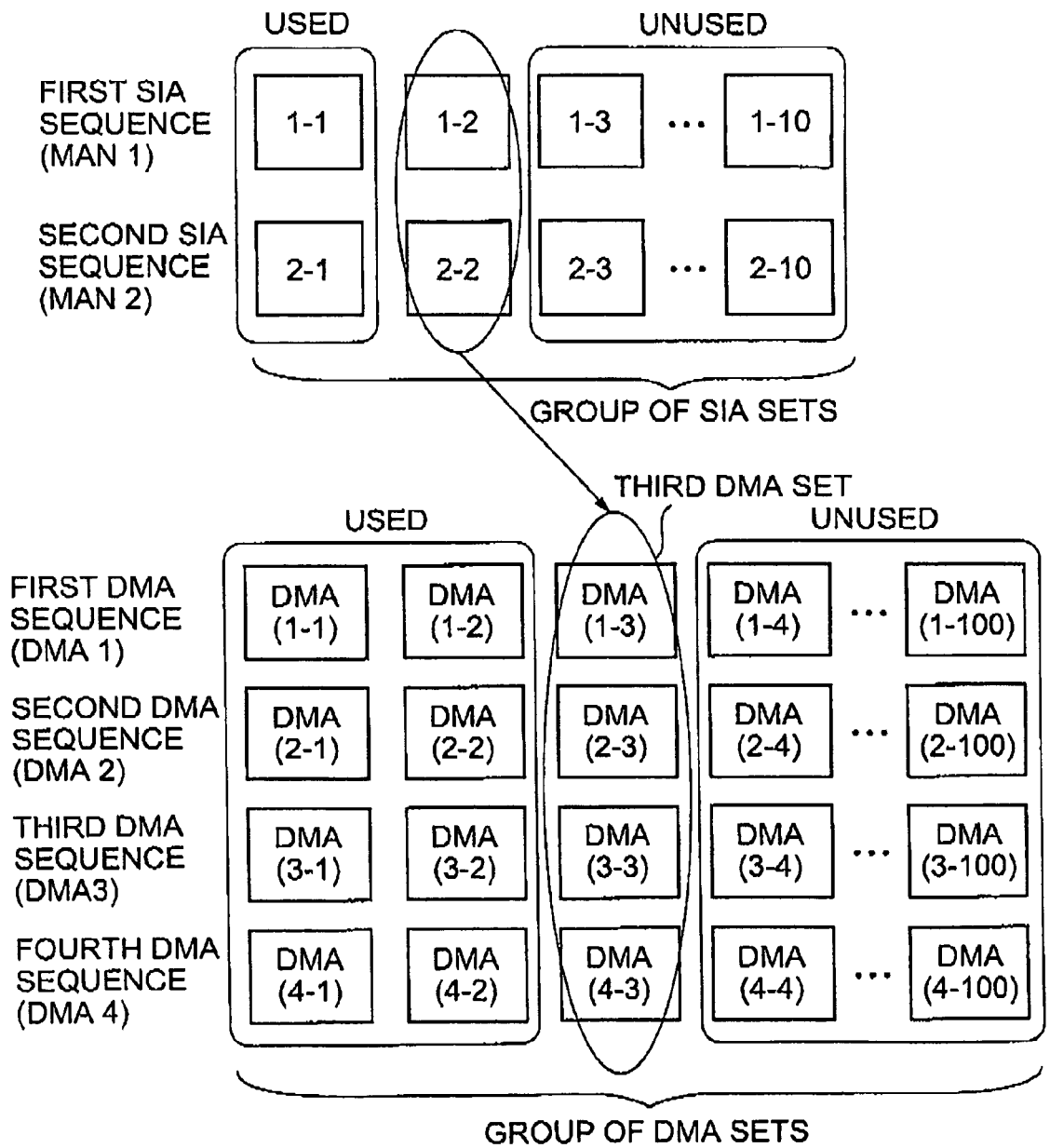
FIG. 9 shows a third state of the DMA sets and the SIA sets when the information recording medium (the optical disc medium) is in use.
Figure 10:
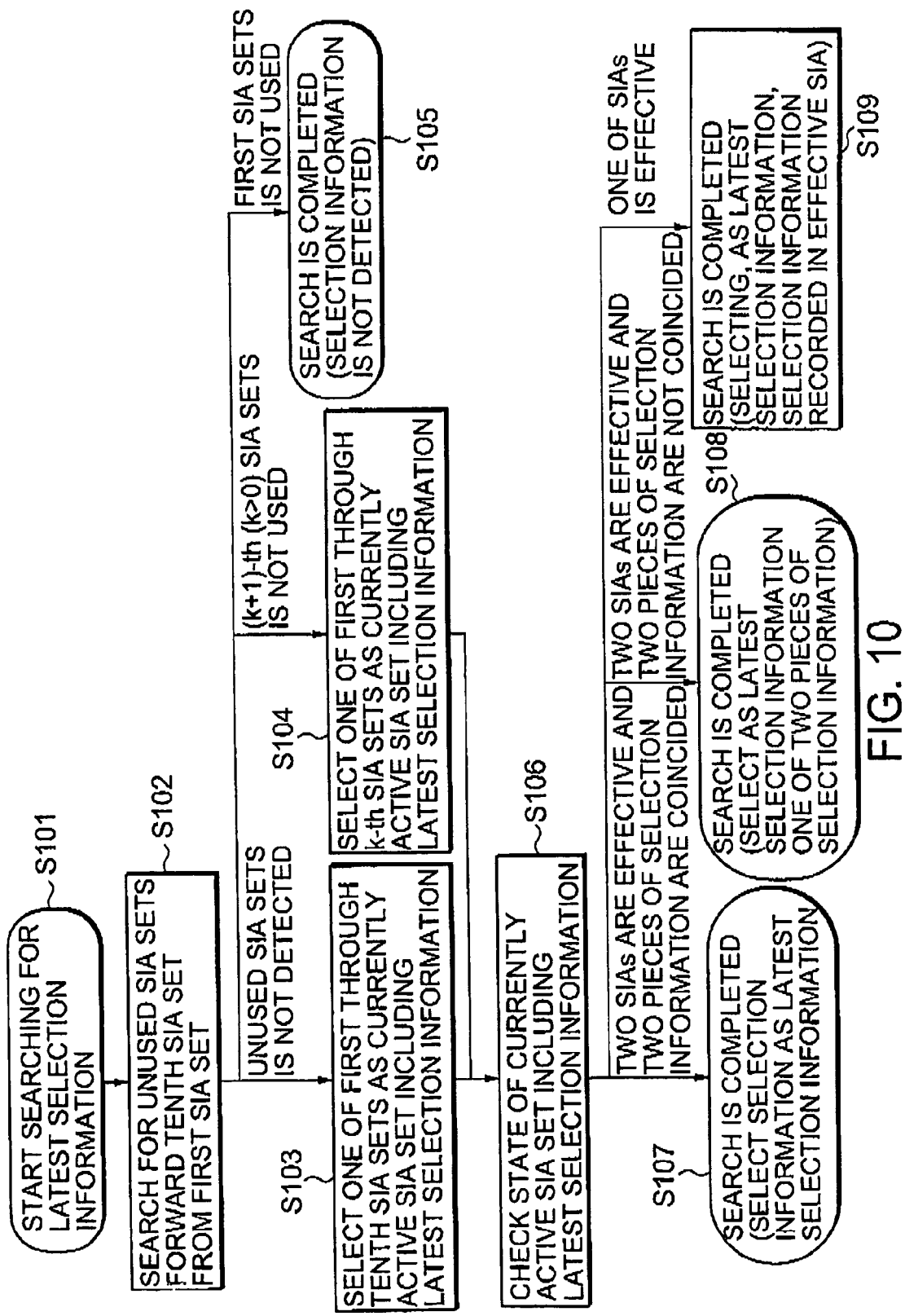
FIG. 10 shows a procedure for extracting and selecting the latest selection information by searching for a currently active SIA set in which the latest selection information to be used is stored.
Figure 11:
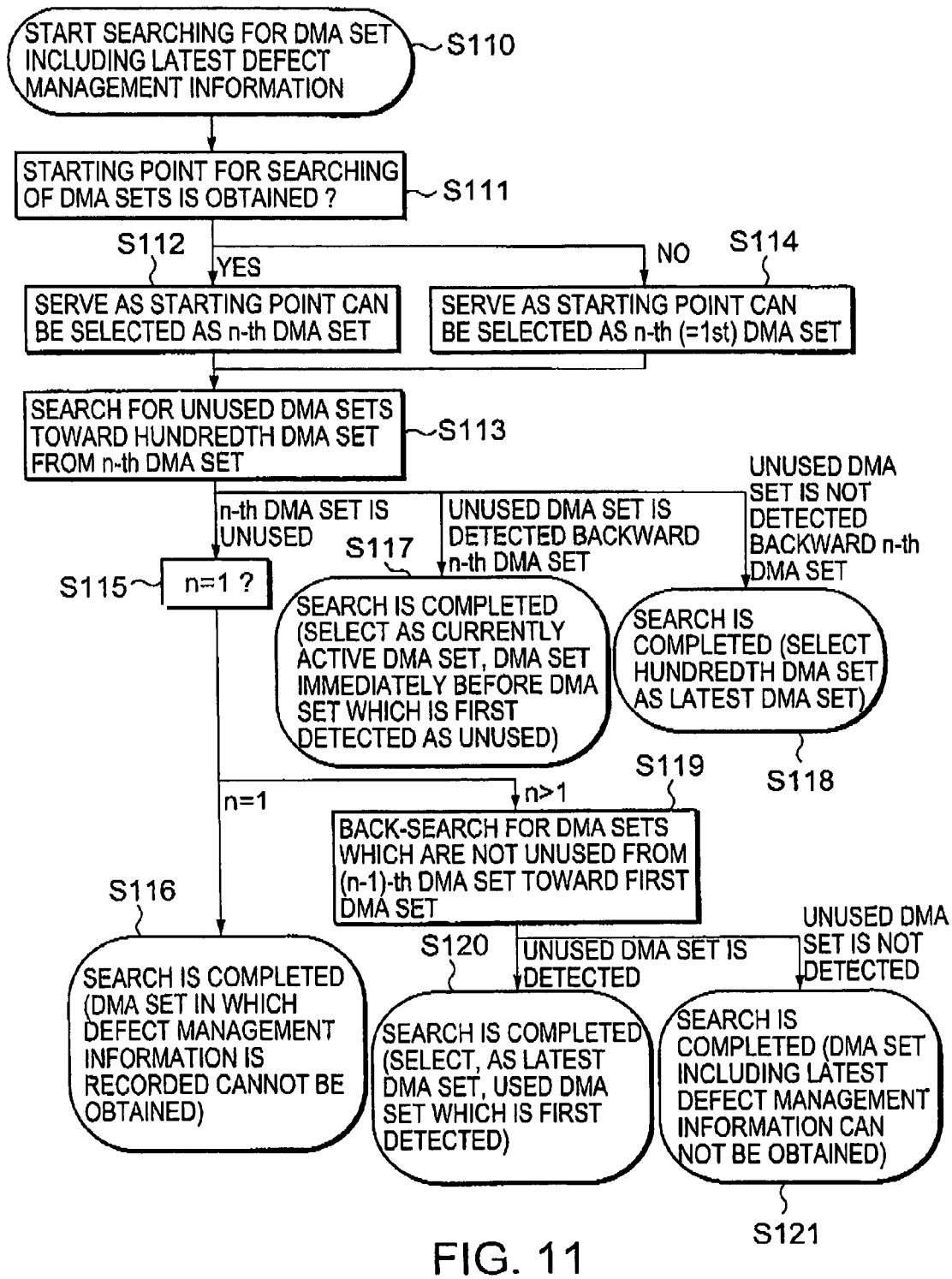
FIG. 11 shows a procedure for searching for a currently active DMA set in which the latest defect management information is recorded.
Figure 12:
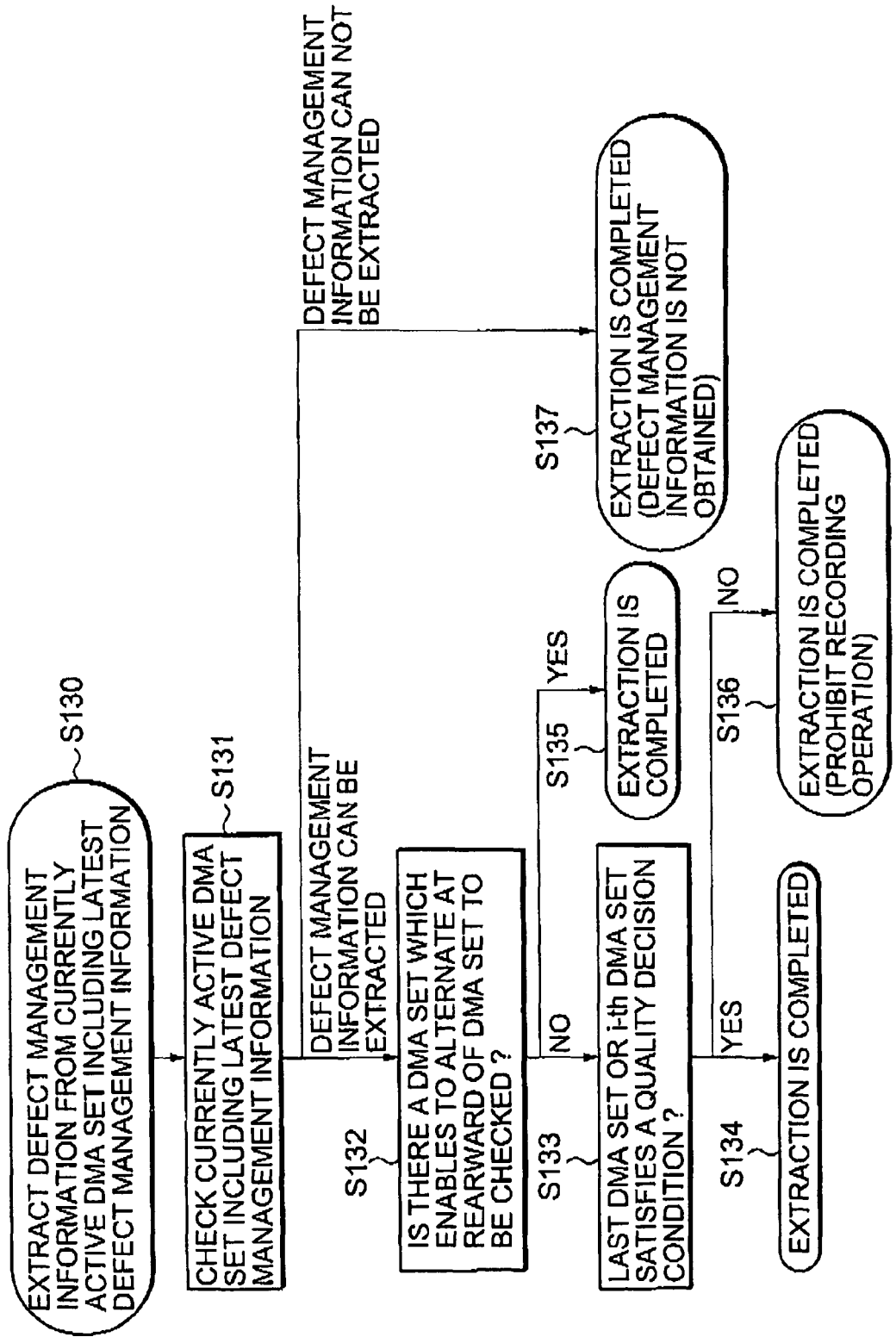
FIG. 12 shows a procedure for extracting the latest defect management information from the currently active DMA set in which the selected latest defect management information to be used is recorded.
Figure 13:
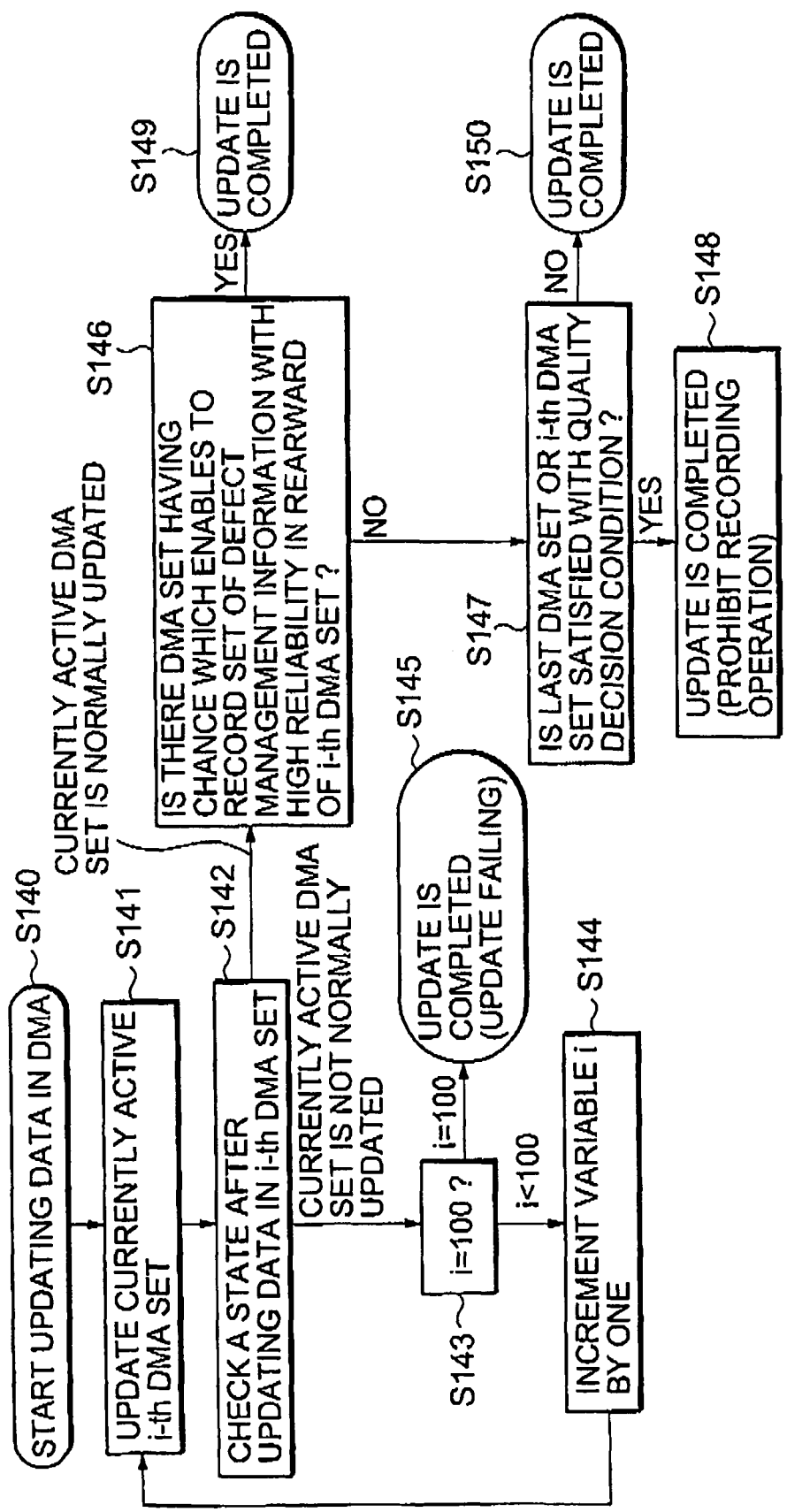
FIG. 13 shows a procedure for updating data in the DMAs.
Figure 14:
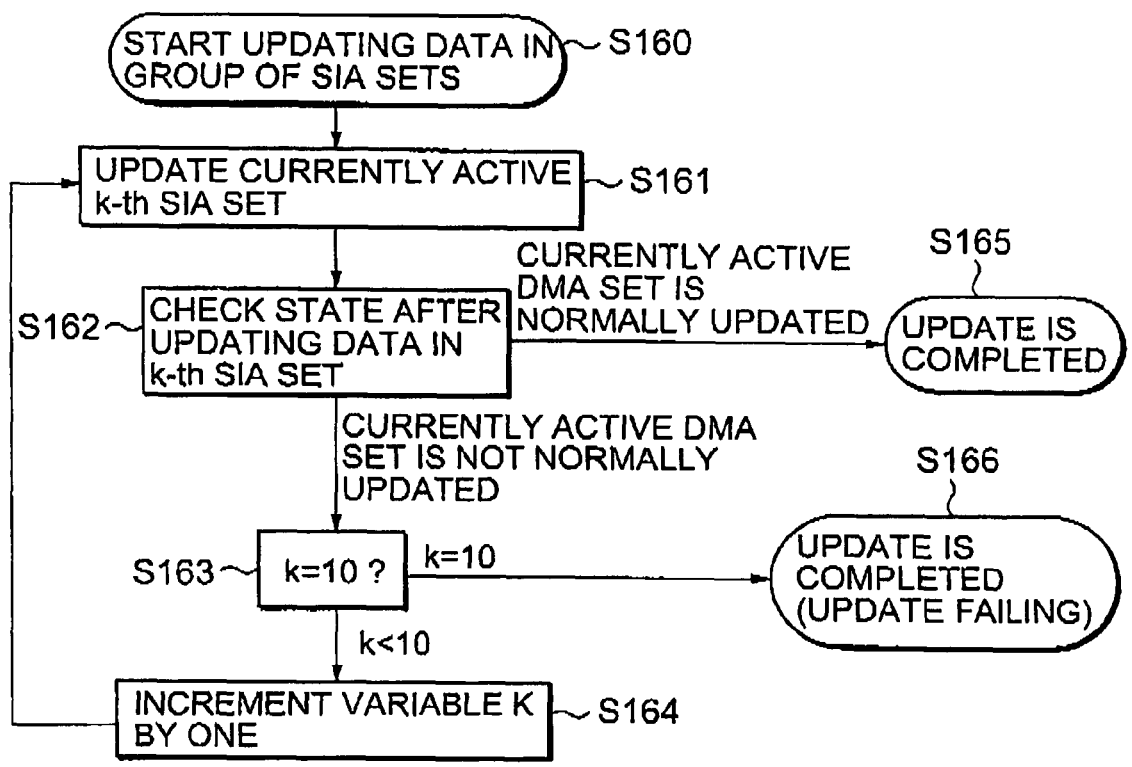
FIG. 14 shows a procedure for updating data in the SIA sets.

FIGS. 7 through 14 are views for use in describing a defect information managing method according to a first embodiment of this invention, FIG. 7 shows an initial or first state of DMA sets and DMA manager area sets immediately after initializing the information recording medium (the optical disc medium) 11. FIG. 8 shows a second state of the DMA sets and the DMA manager area sets when the information recording medium (the optical disc medium) 11 is in use. FIG. 9 shows a third state of the DMA sets and the DMA manager area sets when the information recording medium (the optical disc medium) 11 is in use. FIG. 10 shows a procedure for searching for a currently active SIA set in which the latest selection information to be used is stored and extracting the latest selection information from the currently active SIA set. FIG. 11 shows a procedure for searching for a currently active DMA set in which the latest defect management information is recorded. FIG. 12 shows a procedure for extracting the latest defect management information from the currently active DMA set in which the selected latest defect management information to be used is recorded. FIG. 13 shows a procedure for updating data in the DMA sets. FIG. 14 shows a procedure for updating data in the SIA sets.

In the manner which is described above, as shown in FIG. 7, the information recording medium (the optical disc medium) 11 comprises the group of DMA sets and the group of SIA sets.

The information recoding medium 11 comprises the first through the fourth DMA sequences DMA1, DMA2, DMA3, and DMA4. The first DMA sequence DMA1 comprises the first through the hundredth DMAs which are depicted at DMA(1-1), DMA(1-1), DMA(1-3), DMA(1-4), . . . , and DMA(1-100), respectively. The second DMA sequence DMA2 comprises the first through the hundredth DMAs which are depicted at DMA(2-1), DMA(2-2), DMA(2-3), DMA(2-4), . . . , and DMA(2-100), respectively. The third DMA sequence DMA3 comprises the first through the hundredth IDMAs which are depicted at DMA(3-1), DMA(3-2), DMA(3-3), DMA(3-4), . . . , and DMA(3-100), respectively. The fourth DMA sequence DMA4 comprises the first through the hundredth DMAs which are depicted at DMA(4-1), DMA(4-2), DMA(4-3), DMA(4-4), . . . , and DMA(4-100), respectively. The first through the hundredth DMAs in the first through the fourth DMA sequences DMAL to DMA4 are collectively called the first through the hundredth DMA sets, respectively. The first through the hundredth DMA sets are collectively called the group of DMA sets. For instance, the first DMAs DMA(1-1), DMA(2-1), DMA(3-1), and DMA(4-1) of the first through the fourth DMA sequences DMA1 to DMA4 is collectively called the first DMA set. In the manner which is described above, the first and the second DMA sequences DMAL and DMA2 are allocated on the lead-in area LI (FIG. 1) on the innermost periphery of the information recording medium (the optical disc medium) 11 while the third and the fourth DMA sequences DMA3 and DMA4 are allocated on the lead-out area LO (FIG. 1) on the outermost periphery of the information recording medium (the optical disc medium) 11. One of the first through the hundredth DMA sets is used as the currently active DMA set in which a set of the latest detect management information is stored or recorded.

The information recoding medium 11 further comprises the first and the second SIA sequences SIA1 and SIA2. The first SIA sequence SIA1 comprises the first through the tenth SIAs which are depicted at SIA(1-1), SIA(1-2), SIA(1-3), . . . , and SAI(1-10), respectively. The second SIA sequence SIA2 comprises the first through the tenth SIAs which are depicted at SIA(2-1), SIA(2-2), SIA(2-3), . . . , and SIA(2-10), respectively. The first through the tenth SIAs in the first and the second SIA sequences SIA1 and SIA2 are collectively called the first through the tenth SIA sets, respectively. The first through the tenth SIA sets are collectively called the group of SIA sets. For example, the first SIAs SIA(1-1) and SIA(2-1) of the first and the second SIA sequences SIA1 and SIA2 are collectively called the first SIA set. In the manner which is described above, the first SIA sequence SIA1 is allocated on the lead-in area LI of the information recording medium (the optical disc medium) 11 while the second SIA sequence SIA2 is allocated on the lead-out area LO of the information recording medium (the optical disc medium) 11. One of the first through the tenth SIA sets is used as the currently active SIA set in which a set of the latest selection information (a set of the latest DMA managers) is stored or recorded.

Referring now to FIGS. 7 to 9, the description will proceed to a method of using the group of DMA sets and the group of SIA sets in the information recording medium (the optical disc medium) 11.

It will be assumed that the first DMA set (DMA(1-1), DMA(2-1), DMA(3-1), and DMA(4-1)) in the first through the fourth DMA sequences DMA1 to DMA4 and the first SIA set (SIA(1-1) and SIA(2-1)) in the first and the second SIA sequences SIA1 and SIA2 enable to use. Under the circumstances, immediately after initializing the information recording medium (the optical disc medium) 11, a use condition of the group of DMA sets and the group of SIA sets is shown in FIG. 7. That is, the first DMA set (DMA(1-1), DMA(2-1), DMA(3-1), DMA(4-1)) is used as the currently active DMA set while the first SIA set (SIA(1-1), SIA(2-1)) is used as the currently active SIA set. In the first SIA set (SIA(1-1), SIA(2-1)), data (a set of the latest selection information) indicative of a location of the first DMA set (DMA (1-1), DMA(2-1), DMA(3-1), DMA(4-1)) is recorded. In the first DMA set (DMA(1-1), DMA(2-1), DMA(3-1), DMA(4-1)), a set of the latest defect management information is recorded. The second through the hundredth DMA sets are unused while the second through the tenth SIA sets are unused.

In order to clearly demonstrate that the second through the hundredth DMA sets and the second through the tenth SIA sets are unused, they are padded with special data structure or special byte data, for example, FFh.

On initialization, it may be decided whether or not the group of DMA sets and the group of SIA sets are qualified for storing information by evaluating them. In order to clearly demonstrate that the DMA sets and the SIA sets, which are decided so as to be not qualified for storing information, are unqualified, they are padded with special data structure or special byte data, for example, AAh.

It is necessary to update data (a set of the latest defect management information) in the group of DMA sets and data (a set of the latest selection information) in the group of SIA sets in a case of carrying out a replacement processing so that it turned out that a part of the user area UA (FIG. 1) is defective on using the user area UA or in a case of initializing or re-initializing the information recording medium (the optical disc medium) 11.

It will be assumed, in the state illustrated in FIG. 7, that it is decided that the first DMA set (DMA(1-1), DMA(2-1), DMA(3-1), DMA(4-1)) cannot be normally updated although a change in the latest defect management information occurs caused by occurrence of replacement to be required to renew or update the contents in the first DMA set (DMA(1-1), DMA(2-1), DMA(3-1), DMA(4-1)). In this event, a new DMA set is required in lieu of the first DMA set (DMA(1-1), DMA(2-1), DMA(3-1), DMA(4-1)). When the second DMA set (DMA(1-2), DMA(2-2), DMA(3-2), DMA(4-2)) can normally used, a processing for updating data in the first SIA set (SIA(1-1), SIA(2-1)) so as to indicate a location of the second DMA set (DMA(1-2), DMA(2-2), DMA(3-2), DMA(4-2)) is carried out. It will be assumed that the first SIA set (SIA(1-1), SIA(2-1)) can normally updated. In this event, recorded in the first SIA set (SIA(1-1), SIA(2-1)), a set of the latest selection information indicates the location or an address of the second DMA set (DMA(1-2), DMA(2-2), DMA(3-2), DMA(4-2)), as shown in FIG. 8.

It will be assumed, in the state illustrated in FIG. 8, that the third DMA set (DMA(1-3), DMA(2-3), DMA(3-3), DMA(4-3)) can be normally used in place of the second DMA set (DMA(1-2), DMA(2-2), DMA(3-2), DMA(4-2)) when the second DMA set (DMA(1-2), DMA(2-2), DMA(3-2), DMA(4-2)) cannot normally updated. Under the circumstances, it is necessary to renew or update data (a set of the latest selection information) in the first SIA set (SIA(1-1), SIA(2-1)) so as to indicate a location of the third DMA set (DMA(1-3), DMA(2-3), DMA(3-3), DMA(4-3)) again. In this event, it will be assumed that the second SIA set (SIA(1-2), SIA(2-2)) can normally used instead of the first SIA set (SIA(1-1), SIA(2-1)) when the first SIA set (SIA(1-1), SIA(2-1)) cannot normally updated. Under the circumstances, a processing for starting use of the third DMA set (DMA(1-3), DMA(2-3), DMA(3-3), DMA(4-3)) is carried out by recording data (a set of the latest selection information) indicative of the location or an address of the third DMA set in the second SIA set (SIA(1-2), SIA(2-2)), as shown in FIG. 9.

Referring now to FIGS. 10 to 12, the description will proceed to a processing procedure for obtaining the latest defect management information to be used in the information recording medium (the optical disc medium) 11. The processing procedure for obtaining the latest defect management information is realized by a combination of a processing procedure for selecting for the latest selection information, a processing procedure for searching for the currently active DMA set in which a set of the latest defect management information is recorded, and a processing procedure for extracting defect management information from the currently active DMA set.

The defect management information is required when an information recording and/or reproducing apparatus 10 (which will later be described in conjunction with FIG. 15) records and/or reproduces data in/from the information recoding medium (the optical disc medium) 11. The information recording and/or reproducing apparatus 10 selects the latest selection information on recognizing the information recording medium (the optical disc medium) 11. The processing procedure for selecting the latest selection information is illustrated in FIG. 10.

(1-1) Step A1:

The information recoding and/or reproducing apparatus 10 carries out a processing for sequentially searching for an unused SIA set forward the tenth SIA set from the first SIA set (steps S101 and S102). The information recording and/or reproducing apparatus 10 carries out a selection processing for selecting one of the first through the tenth SIA sets as the currently active SIA set in which a set of the latest selection information is recorded (step S104). More specifically, it will be assumed that the first through the tenth SIA sets are allocated from the front toward the rear in ascending order, the first through a k-th SIA sets are used and a (k+1)-th through the tenth SIA sets are unused, where k represents a variable between one and nine, both inclusive. Under the circumstances, the above-mentioned selection processing comprises the steps of sequentially searching the fist through the tenth SIA sets from the front, of first detecting the (k+1)-th SIA set which is unused, and of selecting, as the currently active SIA set, the latest one of the first through the k-th SIA sets that includes at least one effective SIA in which the latest selection information is recorded.

A condition for deciding that the SIA sets are unused comprises a condition where at least one ECC block constituting the SIA set enables to correct data byte errors and a condition where all ECC blocks enable to correct the errors are padded with particular byte date indicative of unused, for example, FFh.

A condition for deciding that the SIA is effective comprises a condition where an ECC block recorded in the SIA enables to correct data byte errors and a condition where the ECC block enabling to correct the errors has a proper structure as the selection information.

It will be assumed that it is decided that the first SIA set (SIA(1-1), SIA(2-1)) is unused. In this event, the information recording and/or reproducing apparatus 10 decides that the selection information is not detected or found because all of the first through the tenth SIA sets are not used in the past (step S105).

It will be assumed that it is decided that any unused SIA set is not detected or not found among the first through the tenth SIA sets. In this event, the information recording and/or reproducing apparatus 10 decides that all of the first through the tenth SIA sets are used in the past and carries out a selection processing for selecting, as the currently active SIA set, the latest one of the first through the tenth SIA sets that includes at least one effective SIA in which the latest selection information is recorded (step S103).

When the effective SIA is not existed in a sequential searching range, the information recording and/or reproducing apparatus 10 decides that the selection information is not detected or not found (step S105).

(1-2) Step A2:

It will be presumed that the currently active SIA set in which a set of the latest selection information (the latest DMA managers) is selected or extracted in the above-mentioned step A1. In this event, the information recording and/or reproducing apparatus 10 carries out a processing for checking a state of the currently active SIA set (step S106).

It will be assumed that both of two SIAs constituting the currently active SIA set are effective and two pieces of selection information (two DMA managers) recorded in the two SIAs in question are coincided with each other. In this event, the information recording and/or reproducing apparatus 10 carries out a processing for selecting the selection information in question as the latest selection information (step S107).

It will be presumed that both of the two SIAs constituting the currently active SIA set are effective and the two pieces of selection information (the two latest DMA managers) recorded in the two SIAs in question are not coincided with each other. In this event, the information recording and/or reproducing apparatus 10 carries out a processing for selecting, as the latest selection information, one of the two pieces of selection information in question that has the DMA manager update counter having the largest counted value (step S108). Inasmuch as the DMA sets are sequentially used from the front, it may be possible to decide the latest selection information by comparing positions or locations of the DMA sets indicated by the two pieces of selection information.

It will be assumed that only one of the two SIAs constituting the currently active SIA set is effective. Under the circumstances, the information recording and/or reproducing apparatus 10 carries out a processing for selecting, as the latest selection information, the selection information recorded in the effective SIA (step S109).

The information recording and/or reproducing apparatus 10 uses the currently active DMA set indicated by the latest selection information as the starting point of sequential searching of the DMA set which is carried out at a later time. If the DMA set indicated by the latest selection information is the currently active DMA set in which a set of the latest defect management information is stored, the information recording and/or reproducing apparatus 10 may carry out on the above-mentioned selection processing without carrying out the sequential searching of the DMA sets. Under the circumstances, it is possible to shorten a time interval consuming for obtaining the latest defect management information because a searching of the DMA sets is not carried out. However, it is desirable to carry out the searching of the DMA sets in order to certainly select the currently active DMA set for storing a set of the latest defect management information.

Subsequently, the information recording and/or reproducing apparatus 10 carries out a processing for searching the group of DMA sets for the currently active DMA set in which a set of the latest defect management information is recorded. A processing procedure for searching the currently active DMA set in which the set of the latest defect management information is recorded is shown in FIG. 11. Herein, the first through the hundredth DMA sets are allocated from the front toward the rear in ascending order.

(2-1) Step B1:

The information recording and/or reproducing apparatus 10 carries out a processing for deciding whether or not the starting point for the searching of the DMA sets is obtained at the above-mentioned steps A1 and A2 (step S111). It will be assumed that the DMA set serving as the starting point can be selected as an n-th DMA set, where n represents a variable between one and a hundred, both inclusive. In this event, the information recording and/or reproducing apparatus 10 carries out a processing for performing the sequential searching for the unused DMA set toward the hundredth DMA set from the n-th DMA set (steps S212 and S113). It will be presumed that the DMA set serving as the starting point cannot be selected. Under the circumstances, the information recording and/or reproducing apparatus 10 carries out a processing for performing the unused DMA sets toward the hundredth DMA set from the first DMA set with the variable n equal to one (steps S114 and S113).

(2-2) Step B2:

In addition, a condition for deciding that the DMA set is unused comprises a condition where at least one ECC block constituting the DMA set enables to correct data byte errors on sequentially searching for an unused DMA set towards the hundredth DMA set and a condition where all ECC blocks enabling to correct the errors are padded with byte data indicative of unused, FFh.

It will be assumed that the n-th DMA set at which the searching is started is unused and the variable n is equal to one, namely, n=1 (step S115). In this event, the information recording and/or reproducing apparatus 10 decides that the DMA set in which the defect management information is recorded cannot be obtained (step S116) and decides that the information recording medium (the optical disc medium) 11 is an information recording medium which is required to initialize in advance of normal recording and/or reproducing.

It will be presumed that the n-th DMA set at which the searching is started is unused and the variable n is more than one, namely, n>1. In this event, the information recording and/or reproducing apparatus 10 decides that a OMA set in which a set of the latest defect management information is recorded is present forward of the n-th DMA set. In order to sequentially back-search for the DMA set which is not unused from an (n−1)-th DMA set toward the first DMA set, the information recording and/or reproducing apparatus 10 carries out a processing a step B3 which will later be described.

It will be assumed that the n-th DMA set serving as the starting point for searching is not unused. In this event, the information recording and/or reproducing apparatus 10 carries out a processing for selecting, as the currently active DMA set in which a set of the latest defect management information is recorded, a DMA set immediately before the DMA set which is first detected or found as unused. More specifically, it will be presumed that it is decided that the currently active DMA set in which a set of the latest defect management information is recorded is present the rearward of the n-th DMA set (including the n-th DMA set). The information recording and/or reproducing apparatus 10 carries out a searching processing within the group of DMA sets along order to be used. That is, the information recording and/or reproducing apparatus 10 carries out a processing for sequentially forward-searching for the unused DMA set from an (n+1)-th DMA set toward the hundredth DMA set (S113). In this event, the information recording and/or reproducing apparatus 10 first carries out a processing for selecting, as an (i+1)-th DMA set, the DMA set which is first detected or found as an unused DMA set, where i represents a variable between n and ninety-nine, both inclusive. Successively, the information recording and/or reproducing apparatus 10 carries out a processing for selecting an i-th DMA set as the currently active DMA set in which a set of the latest defect management information is recorded when the (i+1)-th DMA set is unused (step S117). Alternatively, the information recording and/or reproducing apparatus 10 may select, as the currently active DMA set in which a set of the latest defect management information is recorded, the latest one of the DMA sets at the front of the i-th DMA set that enables to reproduce a set of the defect management information.

It will be assumed that any unused DMA set is not detected or found on carrying out the processing for searching for the unused DMA set from the (n+1)-th DMA set toward the hundredth DMA set (step S113). In this event, the information recording and/or reproducing apparatus 10 carries out a processing for selecting the hundredth DMA set as the currently active DMA set in which a set of the latest defect management information is recorded (step S118). Alternatively, the information recording and/or reproducing apparatus 10 may select, as the currently active DMA set in which a set of the latest defect management information is recorded, the latest one of the DMA sets at the front of the hundredth DMA set that enables to reproduce a set of the defect management information.

(2-3) Step B3:

The information recording and/or reproducing apparatus 10 carries out a processing for sequentially back-searching for the DMA set which is not unused from the (n−1)-th DMA set toward (back to) the first DMA set (step S119). Herein, it will be assumed that the first detected (found) DMA set which is not unused is the i-th DMA set. When the i-th DMA set is not unused, the information recording and/or reproducing apparatus 10 carries out a processing for selecting the i-th DMA set as the currently active DMA set in which a set of the latest defect management information is recorded (step S120). It will be presumed that the DMA set which is not unused can be not detected or found. In this event, the information recording and/or reproducing apparatus 10 carries out a decision processing so that the currently active DMA set in which a set of the latest defect management information is recorded cannot be obtained (step S121) and decides that the information recording medium (the optical disc medium) 11 is a medium required to initialize prior to normal recording and/or reproducing.

In the above-mentioned step B3, the information recording and/or reproducing apparatus 10 may search for the DMA sets each of which is not unused and enables to reproduce a set of the defect management information. Specifically, it will be assumed that the first detected (found) DMA set which is not unused and enables to reproduce the defect management information is the i-th DMA set. Under the circumstances, the information recording and/or reproducing apparatus 10 carries out a processing for selecting for the i-th DMA set as the currently active DMA set in which a set of the latest defect management information. In addition, it will be presumed that any DMA set which is not unused and enables to reproduce a set of the defect management information is not detected or found. In this event, the information recording and/or reproducing apparatus 10 decides that the information recording medium (the optical disc medium) 11 in question is a medium required to initialize prior to normal recoding and/or reproducing.

FIG. 12 shows a processing procedure for extracting the defect management information from the currently active DMA set in which a set of the latest defect management information is recorded.

(3-1) Step C1:

The information recording and/or reproducing apparatus 10 carries out a processing for checking whether or not it is possible to extract the defect management information from the currently active DMA set in which a set of the latest defect management information is recorded (S131).

A condition for deciding that it is possible to extract the defect management information from the currently active DMA set is, for example, as follows:

From the DDS/PDL ECC blocks and SDL ECC blocks recorded in the currently active DMA set, at least one pairs of DDS/PDL ECC block and SDL ECC block are obtained which satisfy the following conditions:

(a) data byte errors in the ECC block can be corrected;
(b) the DDS Identifier has 0A0Ah; and
(c) the counted values in the DDS/PDL update counters are coincided with each other.

When it is decided that it is possible to extract the defect management information from the currently active DMA set, extraction of the defect management information from the currently active DAM set attains success. Accordingly, the processing procedure for extracting a set of the latest defect management information from the currently active DMA set may reach completion. However, in this embodiment, in order to hold reliability for the defect management information with a high degree, the following processing is added. That is, the step C1 is succeeded by a step C2 which will later be described.

It will be assumed that it is decided that it is impossible to extract a set of the defect management information from the currently active DMA set. In this event, the information recording and/or reproducing apparatus 10 decides that the defect management information is not be obtained. Therefore, the information recording and/or reproducing apparatus 10 decides that the information recording medium (the optical disc medium) 11 in question is a medium required to initialize prior to normal recoding and/or reproducing.

It will be presumed that there is no DMA set which can alternatively use to the rearward of the currently active DMA set. Under the circumstances, there is no DMA set in place of the currently active DMA set when the currently active DMA set degenerates and there is a possibility of falling into a situation where the defect management information is lost. In order to avoid such a situation, it is necessary to highly hold reliability of data (a set of the defect management information) recorded in the last or the hundredth DMA set where there is no DMA set capable of alternatively using to the rearward thereof.

For this purpose, in this embodiment, the information recording and/or reproducing apparatus 10 carries out a processing for surveying whether or not there is an alternate DMA set having possibility which enables to record a set of the defect management information with high reliability to the rearward of the currently active DMA set.

In a case where there is the alternate DMA set having the possibility which enables to record a set of the defect management information with high reliability, there is a low probability that the defect management information is lost by alternating or replacing the current active DMA set into a new one although the currently active DMA set degenerates.

It will be assumed that there is no alternate DMA set having the probability which enables to record a set of the defect management information with high reliability, replacement of the DMA sets is not carried out from then on. This is because there is no guarantee that it is possible to hold the defect management information with high reliability although the replacement is carried out. Accordingly, the currently active DMA set serves as the last DMA set.

When the last DMA set is used, the information recording and/or reproducing apparatus makes a test on reliability of the last DMA set. Furthermore, when the reliability of the last DMA set is low, the information recording and/or reproducing apparatus 10 imposes limitations on a recording operation for the information recording medium (the optical disc medium) 11 from then on. By this processing procedure, it is possible to avoid degenerating at least the currently active DMA set due to recording.

(3-2) Step C2:

The information recording and/or reproducing apparatus 10 carries out a processing for deciding whether or not there is a DMA set having probability which enables to record a set of the defect management information with high reliability at the rearward of the i-th DMA set in which a set of the latest defect management information is recorded (step S132).

Herein, a decision condition of deciding that a DMA set is the DMA set having probability which enables to record a set of the defect management information at high reliability comprises, for example, at least three among fields in which the DDS/PDL should be recorded and at least three among fields in which the SDL should be recorded, that ECC blocks recorded in the respective fields enable to correct data byte errors.

Alternatively, the decision condition of deciding that a DMA set is the DMA set having probability which enables to record a set of the defect management information at high reliability may comprise at least one among the fields in which DDS/PDL should be recorded and at least one among the fields in which the SDL should be recorded, that ECC blocks recorded in the respective fields enable to correct data byte errors. In this event, the decision condition is relieved.

It will be assumed that there is the DMA set having probability which enables to record a set of the defect management information at high reliability. In this event, the information recording and/or reproducing apparatus 10 can record and/or reproduce data in/from the information recording medium (the optical disc medium) 11 by extracting the defect management information from the currently active DMA set (step S135). If the i-th DMA set degenerates, the (i+1)-th DMA set immediately following the i-th DMA set is alternatively used.

It will be presumed that there is no DMA set having probability which enables to record a set of the defect management information at high reliability. Under the circumstances, the information recording and/or reproducing apparatus 10 does not carry out replacement of the DMA set. For example, it will be assumed that the i-th DMA set serves as the currently active DMA set in which a set of the latest defect management information is recorded and the (i+1)-th through the hundredth DMA sets are operable as alternate DMA sets which should be used in place of the i-th DMA set. Under the circumstances, in a case where there is no DMA set among the alternate DMA sets each having at least three DMAs which can normally use, the information recording and/or reproducing apparatus 10 does not replace the DMA set for recording a set of the latest defect management information. In this event, the information recording and/or reproducing apparatus 10 decides the i-th DMA set as the last DMA set and proceeds a processing to a step C3 which will presently be described.

(3-3) Step C3:

The information recording and/or reproducing apparatus 10 carries out a processing for deciding whether or not the last DMA set or the i-th DMA set satisfies a quality decision condition (step S133). The quality decision condition is, for example, as follows:

From the DDS/PDL ECC blocks and SDL ECC blocks recorded in the currently active DMA set, at least three pairs of DDS/PDL ECC block and SDL ECC block are obtained which satisfies the following conditions:

(a) data byte errors in the ECC block can be corrected;
(b) the DDS Identifier has 0A0Ah; and
(c) the counted values in the DDS/PDL update counters are coincided with each other.

It will be assumed that the last DMA set or the i-th DMA set does not satisfy the quality decision condition. In this event, the information recording and/or reproducing apparatus 10 carries out a processing for prohibiting recording operation of data in the information recording medium (the optical disc medium) 11 from then on (step S136).

In addition, in place of prohibiting recording operation of data in the information recording medium (the optical disc medium) 11, the information recording and/or reproducing apparatus 10 may not carry out update recording of the defect management information although any new defect is detected in the information recording medium (the optical disc medium) 11.

By applying the above-mentioned processing procedure for obtaining the defect management information, it is possible to certainly specify the latest defect management information in a short time and it is possible to hold reliability of the defect management information. By using the latest selection information to limit a searching range of the DMA sets, it is possible to drastically shorten a time required to obtain the defect management information. If the searching range of the DMA sets is not limited, a time takes for sequential searching and it is not acceptable. This is because the DMA sets are equal in number to one hundred and each DMA set consists of four DMAs in this embodiment.

In addition, inasmuch as it regards the DMA set indicated by the selection information as the starting point of searching for the DMA set in which a set of the latest defect management information is recorded to carry out searching for the DMA sets, it is possible to certainly select the DMA set in which a set of the latest defect management information is recorded.

Furthermore, inasmuch as the quality decision condition is provided on evaluating the last DMA set to limit the recording operation in a case where the quality decision condition is not satisfied, it is possible to ensure high reliability of a set of the latest defect information recorded in the last DMA set and it is possible to avoid the information recording and/or reproducing apparatus 10 from falling into the situation where the defect management information is not obtained.

Referring now to FIGS. 13 and 14, the description will proceed to a procedure for updating data in the group of DMA sets and in the group of SIA sets in the information recording medium (the optical disc medium) 11. Updating of the data in question is first carried out by performing the procedure for updating the data in the group of DMA sets. When the DMA sets to be used are changed or replaced in process of an updating processing, it is necessary to change contents in the selection information (DMA manager). Therefore, it is further necessary to carry out a procedure for updating data in the selection information area (SIA).

FIG. 13 shows the procedure for updating data in the DMA. Before updating data in the DMA, it is necessary to decide whether or not the currently active DMA set or the i-th DMA set is updated and recorded. That is, updating and recording is allowed when the i-th DMA set is not the last DMA set or when the i-th DMA set is satisfied with the quality decision condition although the i-th DMA set is the last DMA set.

Decision whether or not the i-th DMA set is the last DMA set or decision whether or not the i-th DMA set is satisfied with the quality decision condition although the i-th DMA set is the DMA set may be omitted by storing or memorizing, in a memory (not shown) of a main control circuit 18 in an information recording and/or reproducing apparatus 10 (FIG. 15), results performed concomitantly with either the processing procedure for extracting the defect management information immediately after inserting the information recording medium (the optical disc medium) 11 in the information recording and/or reproducing apparatus (an optical disc drive) or the procedure for updating contents of the group of DMA sets on initializing the information recording medium (the optical disc medium) 11 or the like.

(4-1) Step D1:

The information recording and/or reproducing apparatus 10 carries out a processing for updating data (the latest defect management information) in the currently active DMA set or the i-th DMA set in order to change or replace a set of the defect management information (step S140).

(4-2) Step D2;

The information recording and/or reproducing apparatus 10 checks a state after updating data in the i-th DMA set (step S141). A condition for deciding that the currently active DMA set is normally updated comprises a condition where at least two DDS/PDL ECC blocks recorded in the currently active DMA set enable to correct data byte errors, a condition where at least two SDL ECC blocks recorded in the currently active DMA set enable to correct data byte errors, and a condition where the DDS/PDL ECC blocks and DDL ECC blocks recorded in the currently active DMA set are coincided with the recorded data.

When information changing defects detected in use is added, it is necessary to change or replace only the SDL ECC blocks. In this event, a condition for deciding that the currently active DMA set is normally updated comprises a condition where at least one SDL ECC block recorded in the currently active DMA set enables to correct data byte errors and a condition where the SDL ECC block recorded in the currently DMA set coincides with the recorded data.

When it is decided that the currently active DMA set or the i-th DMA set can be normally updated, updating of data in the currently active DMA set attains success. Therefore, the procedure for updating data may reach completion (steps S146, S149). However, in this embodiment, a processing for holding reliability of the defect management information is added and the information recording and/or reproducing apparatus 10 proceeds a processing to a step D4 which will later be described.

When it is decided that data cannot normally updated caused by degradation of rewriting in the i-th DMA set, the information recording and/or reproducing apparatus 10 proceeds a processing to a step D3, which will presently described, in order to sequentially search for the DMA set which enables to normally update data among the (i+i)-th DMA set through the hundredth DMA set.

(4-3) Step D3:

The information recording and/or reproducing apparatus 10 carries out a processing for distinguishing whether or not the variable i is equal to a hundred (step S143). When the variable i is less than a hundred, the information recording and/or reproducing apparatus 10 proceeds a proceeding to a step D4, which will later be described, in order to start to use a DMA set which should be used immediately after the i-th DMA set. In this event, inasmuch as the used DMA set is changed or replaced, it is necessary to update data in the SIA. When the variable i is equal to a hundred, the information recording and/or reproducing apparatus 10 decides a state where there is no usable DAM set because hundred DMA sets are made full use. Updating of data in the DMA set ends in failure (step S145) and the information recording medium (the optical disc medium) 11 is put into an unserviceable state.

Under the circumstances, in the i-th DMA set or the hundredth DMA set, a set of non-latest defect management information remains or any segment at least non-latest defect management information remains. In the i-th DMA set, data may be recorded by adding particular data structure or particular byte data to a set of defect management information in the i-th DMA set. For example, in the DDS/PDL ECC blocks or SDL ECC blocks, the particular data structure or the particular byte data such as AAh may be padded to record in unused portions such as portions where location information is unrecorded although an area as a local information list is ensured. By adding this procedure, it is possible to distinguish whether a set of the defect management information recorded in the DMA set is the latest one or not.

(4-4) Step D4:

The information recording and/or reproducing apparatus 10 carries out processing for incrementing the variable i by one (step S144).

From then on a step D5, which will later be described, the information recording and/or reproducing apparatus 10 carries out a processing for holding reliability of the defect management information. When there is no DMA set which enables to alternatively use in rearward of the i-th DMA set and when the i-th DMA set is deteriorated, there is a possibility of falling in a situation where the defect management information cannot be obtained because there is no DMA set in place of the i-th DMA set. In order to avoid falling in such a situation, it is necessary to hold high reliability of data (a set of the defect management information) recorded in the last DMA set where there is no DMA set enabling to alternatively use in rearward thereof. For this purpose, in the embodiment, on updating of data in the last DMA set, the information recording and/or reproducing apparatus 10 carries out a processing for defining a quality decision condition and for limiting recording operation for the information recording medium (the optical disc medium) 11 from then on when the last DMA set is not satisfied with the quality decision condition. The quality decision condition used herein is a condition which is similar to that used in the abovementioned step C3.

(4-5) Step D5:

The information recording and/or reproducing apparatus 10 carries out a processing for deciding whether or not there is a DMA set having a chance which enables to record a set of defect management information with high reliability in rearward of the i-th DMA set (step S146). When there is the DMA set having the chance which enables to record a set of defect management information with high reliability, updating of data in the DMA set attains success and an updating procedure is completed (step S149).

When there is no DMA set having the chance when enables to record a set of defect management information with high reliability, the information recording and/or reproducing apparatus 10 carries out a processing for deciding the i-th DMA set as the last DMA set and proceed a processing to a step D6 which will presently be described.

(4-6) Step D6:

The information recording and/or reproducing apparatus 10 carries out a processing for distinguishing whether or not the last DMA set or the i-th DMA set is satisfied with the quality decision condition (step S147).

When the last DMA set or the i-th DMA set is satisfied with the quality decision condition, updating of data in the DMA set attains success and an update procedure is completed (step S150). When data in the DMA set is normally updated and when the last DMA set or the i-th DMA set is not satisfied with the quality decision condition, the information processing and/or reproducing apparatus 10 carries out a processing for prohibiting recording operation for the information recording medium (the optical disc medium) 11 from that time onward (step S148).

In addition, in place of prohibiting recording operation for the information recording medium (the optical disc medium) 11, the information recording and/or reproducing apparatus 10 may not update to record the defect management information although a new defect is detected in the information recording medium (the optical disc medium) 11. In the procedure for updating data in the DMA set, reliability of data in the DMA set is ensured by confirming that there is a DMA set which enables to alternatively used in rearward of the DMA set in use or by preventing degradation caused by rewriting of the last DMA set on using the last DMA set where there is no DMA set which enables to alternatively use.

On changing the DMA set in use in the procedure for updating data in the DMA set, it is necessary to update data in the currently active SIA set or the k-th SIA set in order to change location information of the currently active DMA set.

FIG. 14 shows a processing procedure for updating data in the group of SIA sets.

(5-1) Step E1:

In order to change or replace the location information in the DMA set, the information recording and/or reproducing apparatus 10 carries out a processing for updating data in the currently active SIA set or the k-th SIA (step S161).

(5-2) Step E2:

The information recording and/or reproducing apparatus 10 carries out a processing for checking a state after updating of data in the currently active SIA set (step S162).

In addition, a condition of deciding that the SIA set is normally updated comprises a condition where both of ECC blocks recorded in two SIAs constituting the currently active SIA set enable to correct data byte errors and a condition where data recorded in the SIAs are coincided with the recorded data.

When it is decided that the currently active SIA set or the k-th SIA set can be normally updated, an update procedure is completed (step S165).

When it is decided that currently active SIA set or the k-th SIA set cannot be normally updated, the information recording and/or reproducing apparatus 10 proceeds a processing to a step E3, which will presently be described, in order to sequentially search for a SIA set which enables to normally update data from then on the (k+1)-th SIA set.

(5-3) Step E3:

The information recording and/or reproducing apparatus 10 carries out a processing for distinguishing whether or not the variable k is equal to ten (step S163).

When the variable k is less than ten, the information recoding and/or reproducing apparatus 10 proceeds a processing to a step E4, which will later be described, in order to start using of a SIA set which should be used immediately following the currently active SIA set.

When the variable k is equal to ten, the information recording and/or reproducing apparatus 10 decides that ten SIA sets are made full use and the information recording medium (the optical disc medium) 11 is put into a state where there is not usable SIA sets (step S166). That is, the updating of data in the SIA set ends in failure.

(5-4) Step E4:

The information recording and/or reproducing apparatus 10 carries out a processing for incrementing the variable k by one (step S164).

In the manner which is described above, on updating data in the last DMA set, by prohibiting recording operation or by limiting update of data in the DMA set when the quality decision condition is not satisfied, it is possible to ensure the high reliability of data (the defect management information) recorded in the last DMA set and it is possible to avoid falling into the situation where the defect management information cannot be obtained.

In addition, inasmuch as a decision criterion whether or not the SIA set can be normally updated comprises a condition where both of data in two SIAs constituting the SIA set are valid, it is possible to increasing the possibility of obtaining valid data from at least one SIA in the SIA set and it is possible to heighten reliability of a set of the selection information extracted from the SIA set in question.

In addition, in an information recording and/or reproducing apparatus or an information reproducing apparatus each of which does not update the DMAs and SIAs, only the procedure for obtaining the latest management information which should be used is used.

Figure 15:
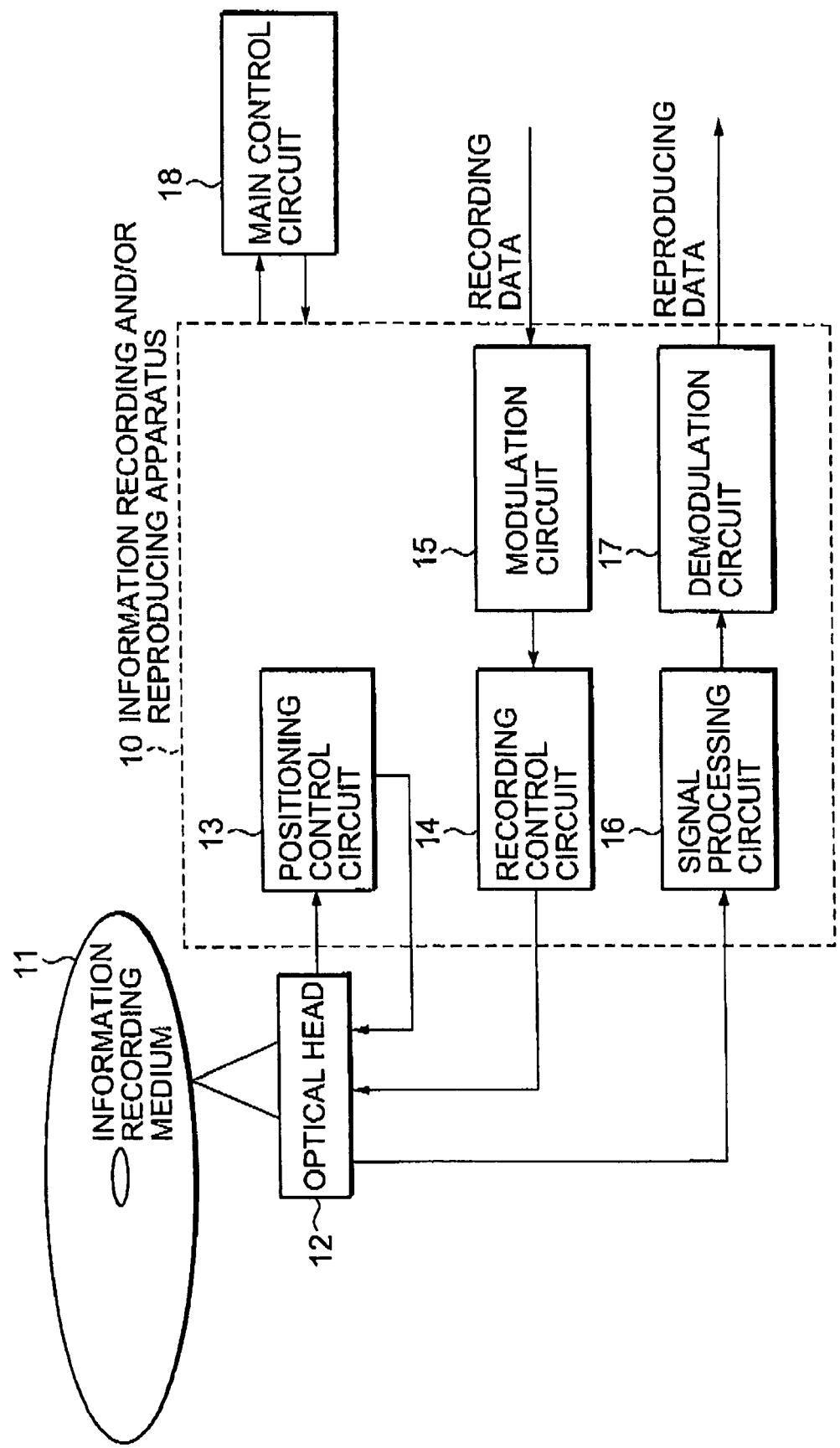
FIG. 15 is a block diagram showing an information recording and/or reproducing apparatus according to a first embodiment of this invention.

FIG. 15 is a block diagram showing an information recording and/or reproducing apparatus 10 according to a first embodiment of this invention.

The illustrated information recording and/or reproducing apparatus 10 comprises an optical disc recording and/or reproducing apparatus 10 for recoding user data on the information recording medium (the optical disc medium) 11 according to this invention and for reproducing recorded user data from the information recording medium (the optical disc medium) 11.

The illustrated optical disc recording and/or reproducing apparatus 10 comprises an optical head 12, a positioning control circuit 13, a recording control circuit 14, a modulation circuit 15, a signal processing circuit 16, a demodulation circuit 17, and a main control circuit (a drive controller) 18. In addition, the optical disc recording and/or reproducing apparatus 10 executes a replacement process for replacing a defective area occurring in the user area UA in the optical disc medium 11 into a wholesome area in the first and the second spare areas SA1 and SA2 as needed.

The description will first proceed to recording of the data by the optical disc recording and/or reproducing apparatus 10. By the modulation circuit 15, recording data is blocked block data every 64 Kbytes, is added error correction code or the like in a predetermined processing procedure, and is modulated to a channel bit sequence. The recording control circuit 14 controls the optical head 12 to record data corresponding to the channel bit sequence on the optical disc medium 11. Emitted by the optical head 12, a laser beam is focused and positioned on the information recording surface of the optical disc medium 11 at a desired potion by the positioning control circuit 13. The positioning control circuit 13, the modulation circuit 15, and the recording control circuit 14 operate under the direction of the main control circuit 18.

Subsequently, the description will proceed to reproducing of data by the optical disc recording and/or reproducing apparatus 10. Reproduced data is produced by converting a signal produced by the optical head 12 into a channel bit sequence by the signal processing circuit 16, and by carrying out error correction every 64 Kbytes in a predetermined processing procedure by the demodulation circuit 17 and so on. Emitted by the optical head 12, the laser beam is focused and positioned on the information recording surface of the optical disc medium 11 at the desired position by the positioning control circuit 13. The positioning control circuit 13, the signal processing circuit 16, and the demodulation circuit 17 operate under the direction of the main control circuit 18.

The main control circuit 18 first reproduces the defect management information. In a case of recording or reproducing the user data, the main control circuit 18 specifies the DMA set to be used on the basis of the above-mentioned defect information managing method according to this invention to obtain information in regard to a position to be recorded or reproduced. In addition, in a case of finding or detecting any defect, the main control circuit 18 updates the currently active DMA set and the currently active SIA set on the basis of the above-mentioned defect information managing method according to this invention.

In addition, the information reproducing apparatus, which does not comprise the recording control circuit 14 and the modulation circuit 15, carries out only operation for specifying the currently active DMA set in which a set of the latest defect management information to be used is recorded. Furthermore, the information recording and/or reproducing apparatus, which does not update the DMA sets and the SIA sets, carries out only operation for obtaining the latest defect management information to be used.

Figure 16:
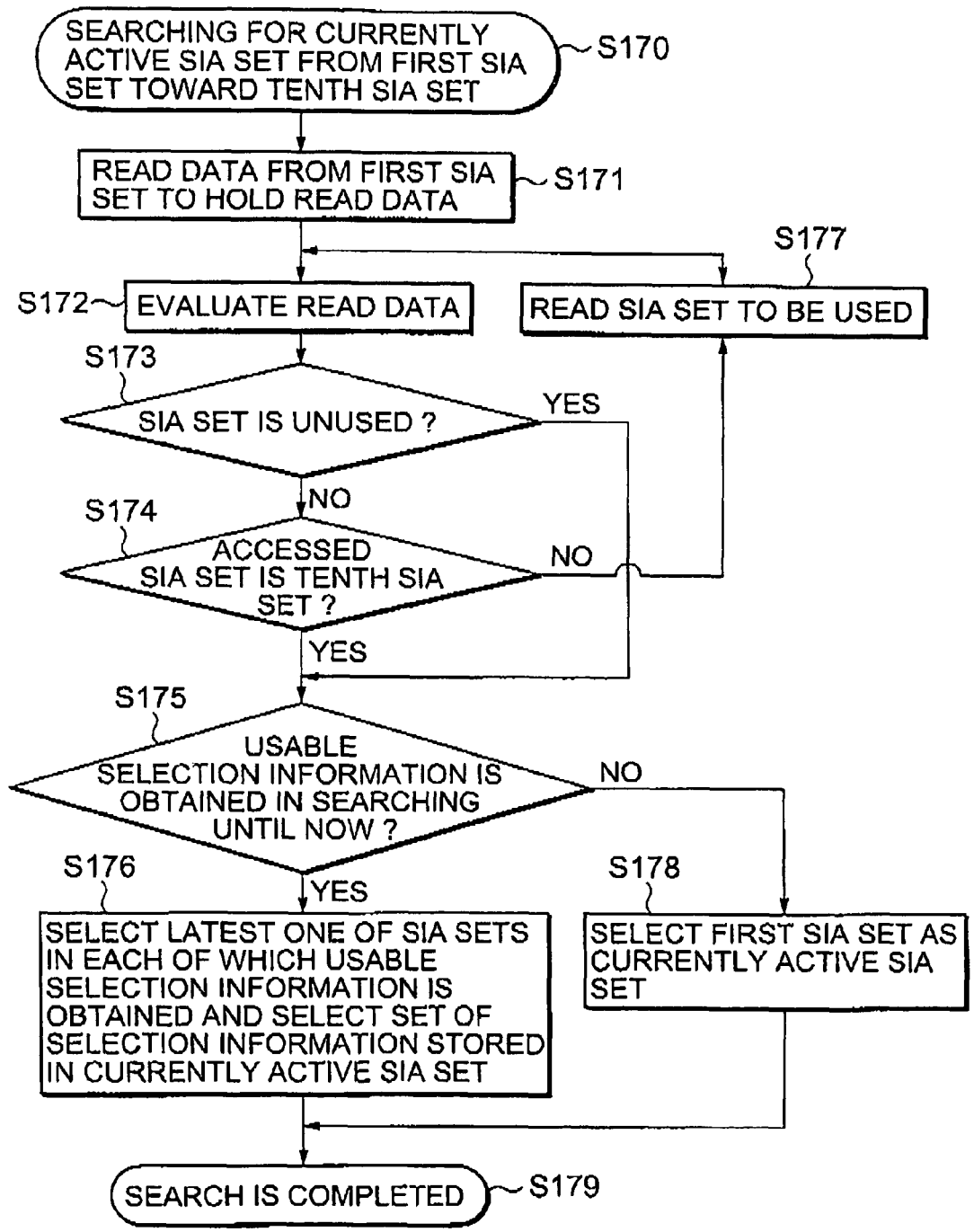
FIG. 16 shows a procedure for searching for the currently active SIA set in which a set of the latest selection information to be used is recorded.
Figure 17:
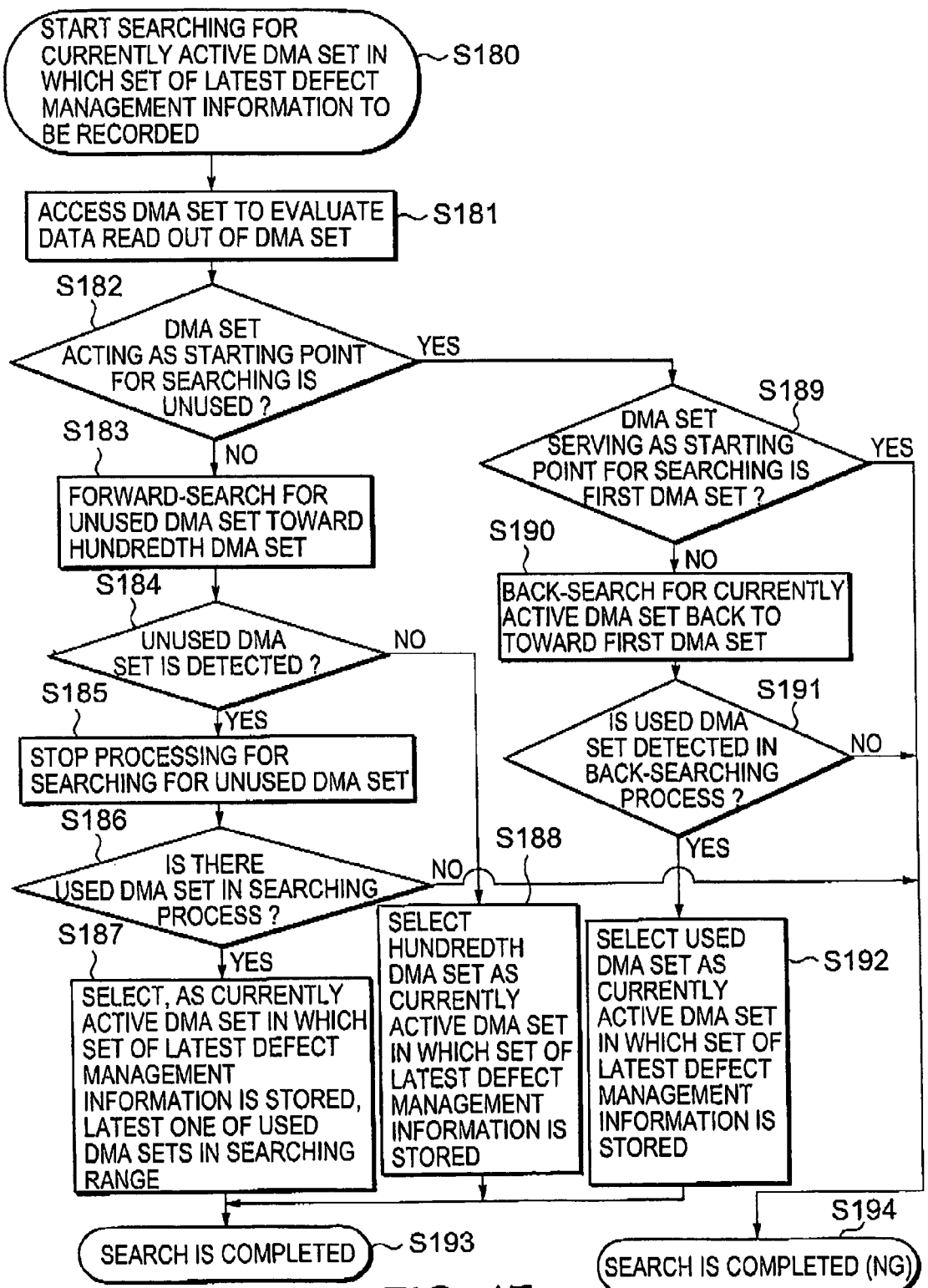
FIG. 17 shows a procedure for searching for the currently active DMA set in which a set of the latest defect management information to be used is recorded.
Figure 18:
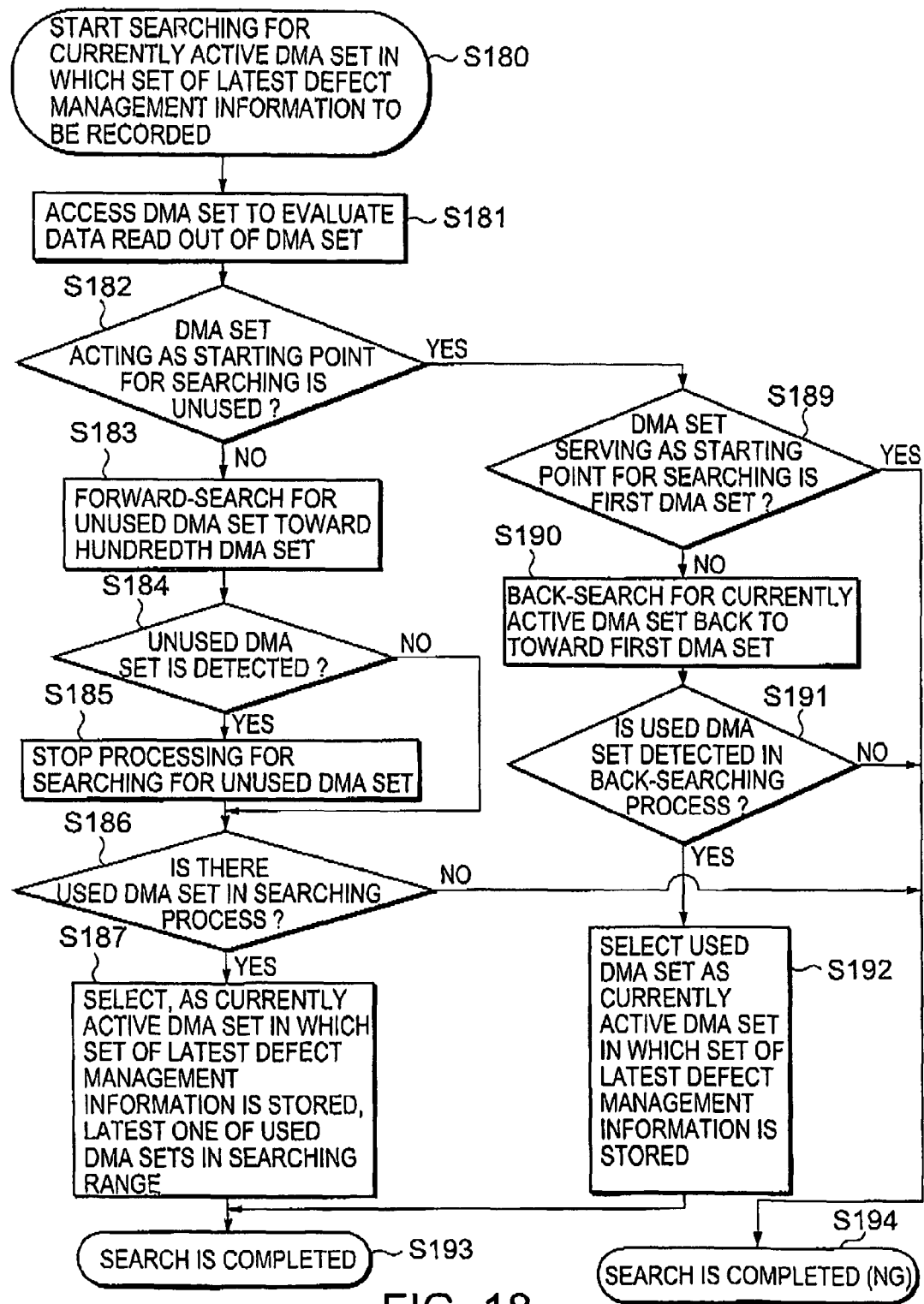
FIG. 18 shows another procedure into which the processing procedure illustrated in FIG. 17 is modified.
Figure 19:
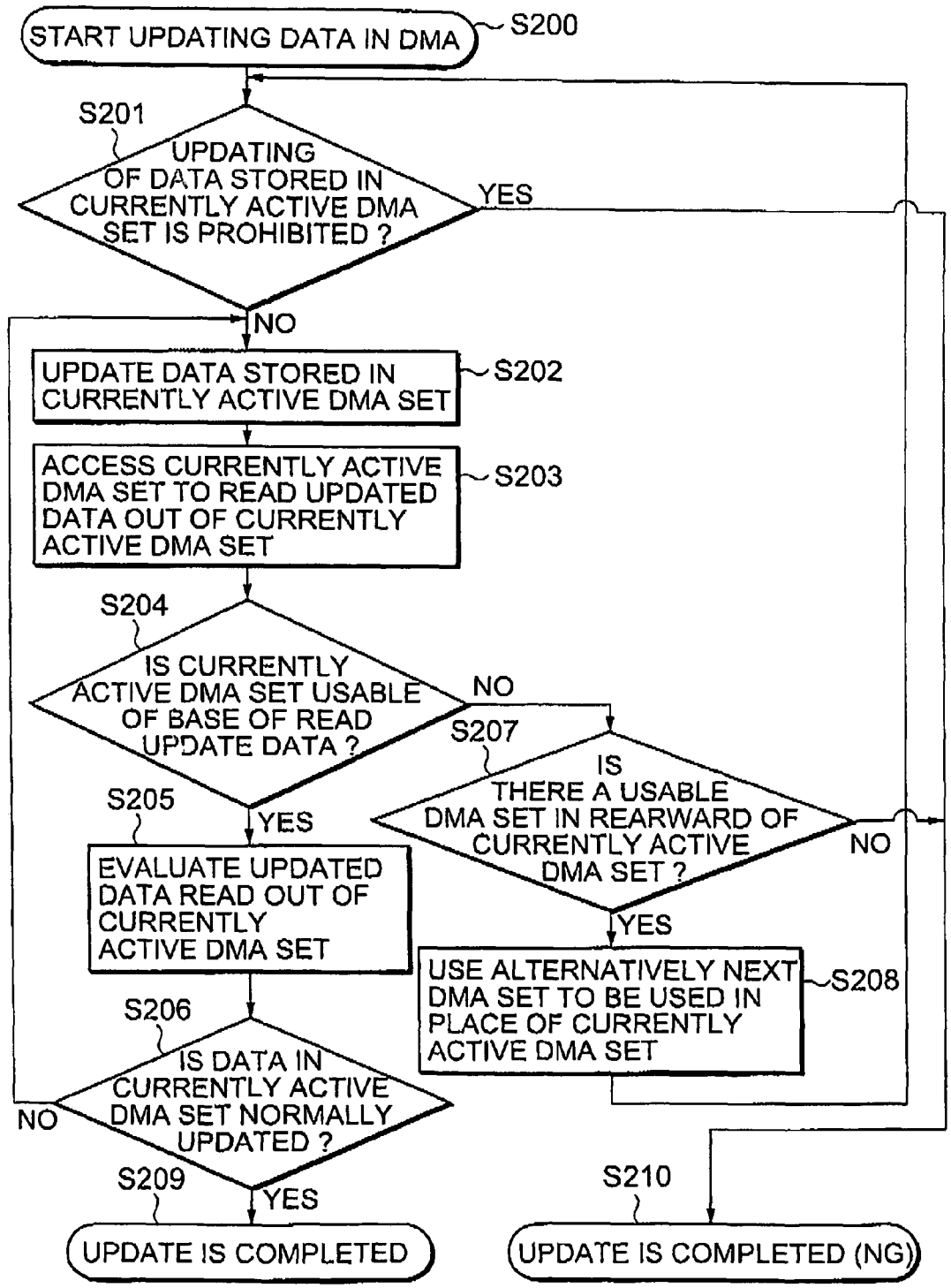
FIG. 19 shows a procedure for updating data in the DMA.
Figure 20:
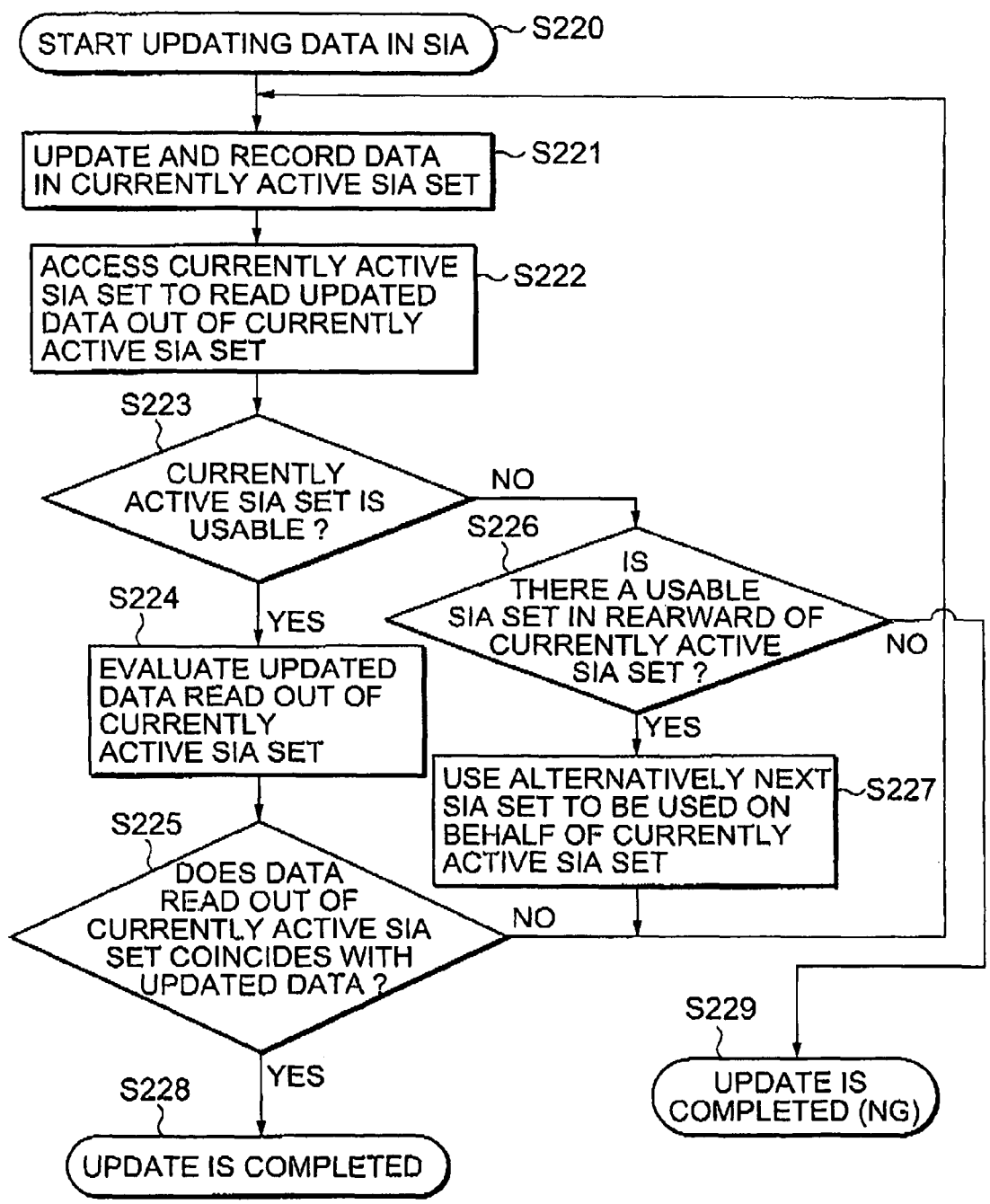
FIG. 20 shows a procedure for updating data in the SIA.

FIGS. 16 through 20 are views for use in describing a defect information management method according to a second embodiment of this invention. FIG. 16 shows a procedure for searching for the currently active SIA set in which a set of the latest selection information to be used is recorded, FIG. 17 shows a procedure for searching for the currently active DMA set in which a set of the latest defect management information to be used is recorded. FIG. 18 shows another procedure into which the processing procedure illustrated in FIG. 17 is modified, FIG. 19 shows a procedure for updating data in the DMA. FIG. 20 shows a procedure for updating data in the SIA.

Referring now to FIG. 16, the description will proceed to the processing procedure for searching the currently active SIA set in which a set of the latest selection information is recorded.

(6-1) Step F1:

The information recording and/or reproducing apparatus 10 carries out a processing for searching for the currently active SIA set from the first SIA set toward the tenth SPA set (step S170). The information recording and/or reproducing apparatus 10 carries out a processing for reading data (a set of selection information) from the first SIA set to hold the read data (step S171).

(6-2) Step F2:

The information recording and/or reproducing apparatus 10 carries out a processing for evaluating the read data (step S172).

(6-3) Step F3:

The information recording and/or reproducing apparatus 10 decides whether or not the SIA set is unused on the basis of the read data (step S173). When the SIA set is not unused, the information recording and/or reproducing apparatus 10 proceeds a processing to a step F4 which will presently be described. When the SIA set is unused, the information recording and/or reproducing apparatus 10 proceeds a processing to a step F6 which will later be described.

A condition of deciding that the SIA set is unused comprises a condition where at least one ECC block constituting the selection information enables to correct data byte errors and a condition where the error correctable ECC block is padded with byte data indicative of unused, FFh.

(6-4) Step F4:

The information recording and/or reproducing apparatus 10 carries out a processing for deciding whether or not an accessed SIA set is the tenth SIA set (step S174). When the accessed SIA set is not the tenth SIA set, the information recording and/or reproducing apparatus 10 proceeds a processing to a step F5 which will presently be described. When the accessed SIA set is the tenth SIA set, the information recording and/or reproducing apparatus 10 proceeds a processing to the step F6 which will later be described.

(6-5) Step F5:

The information recording and/or reproducing apparatus 10 accesses a next SIA set to be used to store the read data (step S177). The information recording and/or reproducing apparatus 10 turns back a processing to the above-mentioned step F2.

(6-6) Step F6:

The information recording and/or reproducing apparatus 10 carries out a processing for deciding whether or not usable selection information is obtained in searching until now (step S175). When the usable selection information is obtained, the information recording and/or reproducing apparatus proceeds a processing to a step F7 which will presently be described. When the usable selection information is not obtained, the information recording and/or reproducing apparatus 10 proceeds a processing to a step F8 which will later be described.

(6-7) Step F7:

The information recording and/or reproducing apparatus 10 carries out a processing for selecting, as the currently active SIA set in which a set of the latest selection information stored, the latest one of the SIA sets in each of which the usable selection information is obtained and for selecting, as a set of the latest selection information, a set of the selection information stored in the currently active SIA set (step S176). Therefore, the procedure reaches completion (step S179).

(6-8) Step F8:

The information recording and/or reproducing apparatus 10 carries out a processing for selecting the first SIA set as the currently active SIA set in which a set of the latest selection information is recorded (step S178). However, the information recording and/or reproducing apparatus 10 decides that the selection information is not obtained. Therefore, the processing procedure reaches completion (step S179).

By carrying out the procedure illustrated in FIG. 16, it is possible to select the currently active SIA set (DMA manager area set) in which a set of the latest selection information is recorded and it is possible to obtain the DMA set acting as a starting point for searching for the currently active DMA set in which a set of the latest defect management information is stored.

Referring now to FIG. 17, the description will proceed to the procedure for searching the currently active DMA set in which a set of the latest defect management information is recorded.

(7-1) Step G1:

The information recording and/or reproducing apparatus 10 uses, as the starting point for searching, the DMA set indicated by the selection information when the latest selection information is obtained. The information recording and/or reproducing apparatus 10 uses, as the starting point for searching, the first DMA set when the latest selection information is not obtained. The information recording and/or reproducing apparatus 10 carries out a processing for accessing the DMA set to evaluate data read out of the DMA set (step S181).

(7-2) Step G2:

The information recording and/or reproducing apparatus 10 carries out a processing for deciding whether of not the DMA set acting as the starting point for searching is unused (step S182). When the DMA set is not unused, the information recording and/or reproducing apparatus 10 proceeds a processing to a step G3 which will presently be described. When the DMA set is unused, the information recording and/or reproducing apparatus 10 proceeds a processing to a step G9 which will later be described.

(7-3) Step G3:

The information recording and/or reproducing apparatus 10 carries out a processing for starting forward-searching for unused DMA set toward the hundredth DMA set (step S183). Thereafter, the information recording and/or reproducing apparatus 10 proceeds a processing to a step G4 which will presently be described.

(7-4) Step G4:

The information recording and/or reproducing apparatus 10 carries out a processing for deciding whether or not the unused DMA set is detected or found (step S184). When the unused DMA set is detected or found, the information recording and/or reproducing apparatus 10 proceeds a processing to a step G5 which will presently be described. When the unused DMA set is not detected or found, the information recording and/or reproducing apparatus 10 proceeds a processing to a step G8 which will later be described.

(7-5) Step G5:

The information recording and/or reproducing apparatus 10 stops the processing for searching for the unused DMA set (step S185). Thereafter, the information recording and/or reproducing apparatus 10 proceeds a processing to a step G6 which will presently be described.

(7-6) Step G6:

The information recording and/or reproducing apparatus 10 carries out a processing for deciding whether or not there is a used DMA set in a searching process (step S186). For example, a condition of deciding of the used DMA set comprises a condition where at least one DDS/PDL ECC block and at least one SDL ECC block constituting the DMA set enable to correct data byte errors and are not unused.

If there is the used DMA set, the information recording and/or reproducing apparatus 10 proceeds a processing to a step G7 which will presently be described. If there is no used DMA set, the information recording and/or reproducing apparatus 10 carries out a processing for deciding that the DMA set in which a set of defect management information is recorded is not detected or found and the defect management information is not obtained. Therefore, the procedure reaches completion (step S194).

(7-7) Step G7:

The information recording and/or reproducing apparatus 10 carries out a processing for selecting, as the currently active DMA set in which a set of the latest defect management information is stored, the latest one of the used DMA sets in a searching range and for selecting, as a set of the latest defect management information, a set of the defect management information stored in the currently active DMA set (step S187). Therefore, the procedure reaches completion (step S193).

(7-8) Step G8:

The information recording and/or reproducing apparatus 10 carries out a processing for selecting the hundredth DMA set as the currently active DMA set in which a set of the latest defect management information is stored and for selecting, a set of the latest defect management information, a set of defect management information stored in the currently active DMA set (step S188). Therefore, the procedure reaches completion (step S193).

In addition, in lieu of selecting the hundredth DMA set as the currently active DMA set in which a set of the latest defect management information is stored, the information recording and/or reproducing apparatus 10 may select, as the currently active DMA set in which a set of the latest defect management information is stored, the latest one of the used DMA sets.

(7-9) Step G9:

The information recording and/or reproducing apparatus 10 decides whether or not the DMA set serving as the starting point for searching is the first DMA set (step S189). If the DMA set serving as the starting point for searching is not the first DMA set, the information recording and/or reproducing apparatus 10 proceeds a processing to a step G10 which will presently be described. If the DAM set serving as the starting point for searching is the first DMA set, the information recording and/or reproducing apparatus 10 carries out a processing for deciding that the defect management information cannot obtained because any DMA set in which a set of the defect management information is not detected or found. Herein, the procedure reaches completion (step S194).

(7-10) Step G10:

The information recording and/or reproducing apparatus 10 carries out a processing for back-searching for the currently active DMA set back to toward the first DMA set (step S190). Thereafter, the information recording and/or reproducing apparatus 10 proceeds a processing to a step G11 which will presently be described.

(7-11) Step G11:

The information recording and/or reproducing apparatus 10 carries out a processing for deciding whether or not the used DMA set is detected or found in the back-searching process (step S191). If the used DMA set is detected or found, the information recording and/or reproducing apparatus 10 proceeds a processing to a step G12 which will presently be described. If the used DMA set is not detected or found, the information recording and/or reproducing apparatus 10 carries out a processing for deciding that the defect management information cannot obtained because any DMA set in which a set of the defect management information is not detected or found. Herein, the procedure reaches completion (step S194).

(7-12) Step G12:

The information recording and/or reproducing apparatus 10 carries out a processing for selecting, as the currently active DMA set in which a set of the latest defect management information is stored, the used DMA set which is first detected or found in back-searching started from the above-mentioned step G10 and for selecting, as a set of the latest defect management information, a set of the defect management information stored in the currently active DMA set (step S192). Therefore, the procedure reaches completion (step S193).

By the procedure illustrated in FIG. 17, it is possible to select the currently active DMA set in which a set of the latest defect management information is recorded. By combining the procedures illustrated in FIGS. 16 and 17, it is possible to certainly obtain the latest defect management information in a short time.

In addition, as shown in FIG. 18, when any unused DMA set is not detected or found at the step G4, the information recording and/or reproducing apparatus 10 may proceed a processing to the step G6 in lieu of the step G8. In this event, the step G8 is omitted from the procedure. Instead of the procedure illustrated in FIG. 17, a procedure illustrated in FIG. 18 may be added to the procedure illustrated in FIG. 16.

Referring now to FIG. 19, the description will proceed to the procedure for updating data in the DMA sets.

(8-1) Step H1:

The information recording and/or reproducing apparatus 10 carries out a processing for deciding whether or not updating of data stored in the currently active DMA set is prohibited (step S201). If the updating is not prohibited, the information recording and/or reproducing apparatus 10 proceeds a processing to a step H2 which will presently be described. If the updating is prohibited, the updating of data stored in the currently active DMA set ends in failure and the procedure reaches completion (step S210).

(8-2) Step H2:

The information recording and/or reproducing apparatus 10 carries out a processing for updating and recording data stored in the currently active DMA set (step S202). Thereafter, the information recording and/or reproducing apparatus 10 proceeds a processing to a step H3 which will presently be described.

(8-3) Step H3:

The information recording and/or reproducing apparatus 10 carries out a processing for accessing the currently active DMA set to read updated data out of the currently active DMA set (step S203). Thereafter, the information recording and/or reproducing apparatus 10 proceeds a processing to a step H4 which will presently be described.

(8-4) Step H4:

The information recording and/or reproducing apparatus 10 carries out a processing for deciding whether or not the currently active DMA set is usable of the base of the read updated data (step S204). For instance, a condition of deciding that the currently active DMA set is usable is defined by the number of reproducible DDS/PDL ECC blocks and SDL ECC blocks among the ECC blocks constituting the currently active DMA set and correction conditions of the ECC blocks in question. If the currently active DMA set is usable, the information recording and/or reproducing apparatus 10 proceeds a processing to a step H5 which will presently be described. If the currently active DMA set is not usable, the information recording and/or reproducing apparatus 10 proceeds a processing to a step H7 which will later be described.

(8-5) Step H5:

The information recording and/or reproducing apparatus 10 carries out a processing for evaluating the updated data read out of the currently active DMA set (step S205). Thereafter, the information processing and/or reproducing apparatus 10 proceeds a processing to a step H6 which will presently be described.

(8-6) Step H6:

The information recording and/or reproducing apparatus 10 carries out a processing for deciding whether of not data in the currently active DMA set is normally updated on the basis of the updated data read out of the currently active DMA set (step S206). If the data in the currently active DMA set is normally updated, the processing procedure reaches completion (step S209). If the data in the currently active DMA set is not normally updated, the information recording and/or reproducing apparatus 10 turns a processing back to the above-mentioned step H2.

(8-7) Step H7:

The information recording and/or reproducing apparatus 10 carries out a processing for deciding whether or not there is a usable DMA set in rearward of the currently active DMA set (step S207). If there is the usable DMA set, the information recording and/or reproducing apparatus 10 proceeds a processing to a step H8 which will presently be described. If there is no usable DMA set, updating of data stored in the DMA set ends in failure and the procedure reaches completion (step S210).

(8-8) Step H8:

The information recording and/or reproducing apparatus 10 carries out a processing for alternatively using the next DMA set to be used in place of the currently active DMA set (step S208) and turns a processing back to the above-mentioned step H1.

In the manner which is described above, it is possible to update data stored in the currently active DMA set by the procedure illustrated in FIG. 19.

Referring now to FIG. 20, the description will proceed to the procedure for updating data in the SIAs (DMA manager area sets).

(9-1) Step J1:

The information recording and/or reproducing apparatus 10 carries out a processing for updating and recording data in the currently active SIA set (step 221). Thereafter, the information recording and/or reproducing apparatus 10 proceeds a processing to a step J2 which will presently be described.

(9-2) Step J2:

The information recording and/or reproducing apparatus 10 carries out a processing for accessing the currently active SIA set to read updated data out of the currently active SIA set (step S222). Thereafter, the information recording and/or reproducing apparatus 10 proceeds a processing to a step J3 which will presently be described.

(9-3) Step J3:

The information recording and/or reproducing apparatus 10 carries out a processing for deciding whether or not the currently active SIA set is usable on the basis of the read updated data (step S223). For instance, a condition of deciding that the currently active SIA set is usable is defined by the number of reproducible ECC blocks among ECC blocks constituting the currently active SIA set and correction conditions of the reproducible ECC blocks. If the currently active SIA set is usable, the information recording and/or reproducing apparatus 10 proceeds a processing to a step J4 which will presently be described. If the currently active SIA set is not usable, the information recording and/or reproducing apparatus 10 proceeds a processing to a step J6 which will later be described.

(9-4) Step J4:

The information recording and/or reproducing apparatus 10 carries out a processing for evaluating the updated data read out of the currently active SIA set (step S224). Thereafter, the information recording and/or reproducing apparatus 10 proceeds a processing to a step J5 which will presently be described.

(9-5) Step J5:

The information recording and/or reproducing apparatus 10 carries out a processing for deciding whether or not the data read out of the currently active SIA set coincides with updated data (step S225). If the read data coincides with the updated data, the processing procedure reaches completion (step S228). If the read data does not coincide with the updated data, the information recording and/or reproducing apparatus 10 turns a processing back to the above-mentioned step J1.

(9-6) Step J6:

The information recording and/or reproducing apparatus 10 carries out a processing for deciding whether or not there is a usable SIA set in the rearward of the currently active SIA set (step S226). If there is the usable SIA set, the information recording and/or reproducing apparatus 10 proceeds a processing to a step J7 which will presently be described. If there is no usable SIA set, updating of data in the currently active SIA set ends in failure and herein the procedure reaches completion (step 229).

(9-7) Step J7:

The information recording and/or reproducing apparatus 10 carries out a processing for alternatively using the next SIA set to be used on behalf of the currently active SIA set (step S227) and turns a processing back to the above-mentioned step J1.

In the manner which is described in the procedure illustrated in FIG. 20, it is possible to update data stored in SIA set. In addition, by combining the processing procedures illustrated in FIGS. 19 and 20 with each other, it is possible to update and record the detect management information and the selection information with safety.

According to this invention, it is possible to certainly extract defect management information in a short time from an information recording medium (an optical disc medium). In addition, according to this invention, it is possible to hold reliability of a currently active DMA set in a situation where there is no unused DMA set in lieu of an active DMA set. Furthermore, according to this invention, it is possible to ensure highly reliable selection information on updating data in a SIA set.

While this invention has thus far been described in conjunction with a few preferred embodiments thereof, it is to be understood that modifications will be apparent to those skilled in the art without departing from the sprit of the invention. That is, this invention is applicable to an information recording medium comprising a plurality of defect management areas each of which enables to record defect management information and a plurality of selection information areas each of which enables to record selection information including location information indicative of a location of a currently active defect management area set and it is possible to select the defect management information to be used with high reliability in a short time. Although the information recording medium comprises a plurality of DMA sequences each of which comprises a plurality of DMAs in the above-mentioned embodiments, the information recording medium may comprise only one DMA sequence which comprises a plurality of DMAs. In addition, although the information recording medium comprises a plurality of SIA sequences each of which comprises a plurality of SIAs in the above-mentioned embodiments, the information recording medium may comprise only one SIA sequence which comprises a plurality of SIAs.

What is claimed is:

1. A method of managing defect management information stored in an information recording medium, said information recording medium comprising a user area for storing user data, a plurality of defect management areas each of which enables to record defect management information on said user area, and a plurality of selection information areas each of which enables to record selection information including location information indicative of a location of a currently active defect management area in which the latest defect management information is recorded, said method comprising the steps of:
   (a) selecting the latest selection information by searching said plurality of selection information areas for a currently active selection area in which the latest selection information is recorded; and
   (b) searching, on the basis of the latest selection information, said plurality of defect management areas for the currently active defect management area.

2. The method as claimed in claim 1, wherein said selecting step (a) selects, as the latest selection information, the selection information recorded in the latest used one of the selection information areas where the selection information can normally be reproduced.

3. The method as claimed in claim 1, wherein said searching step (b) includes the step of (b1) staffing searching for said currently active defect management area from a searching staff area.

4. The method as claimed in claim 3, wherein said searching staff area in the defect management areas is indicated by said latest selection information.

5. The method as claimed in claim 3, wherein said searching staff area in the defect management areas should be used first.

6. The method as claimed in claim 1, wherein said searching step (b) further includes the step of (b2) sequentially forward-searching the plurality of defect management areas along in the order in which the plurality of defect management areas should be used when a searching start area is not unused.

7. The method as claimed in claim 6, wherein said sequentially forward-searching step (b2) includes the step of searching the plurality of defect management areas along in the order in which the plurality of defect management areas should be used for an unused defect management area.

8. The method as claimed in claim 7, wherein said sequentially forward-searching step (b2) further comprises the step of selecting, as the latest defect management information, the defect management information recorded in a used defect management area immediately before the unused defect management area which is first detected.

9. The method as claimed in claim 7, wherein said sequentially forward-searching step (b2) further comprises the step of selecting, as the latest defect management information, the defect management information recorded in the latest used one of used defect management areas, in which the defect management information can be reproduced, immediately before the unused defect management area which is first detected.

10. The method as claimed in claim 7, wherein said sequentially forward-searching step (b2) further comprises the step of selecting, as the latest defect management information, the defect management information recorded in the last one of the plurality of defect management areas that should be last used when the unused defect management area is not detected.

11. The method as claimed in claim 7, wherein said sequentially forward-searching step (b2) further comprises the step of selecting, as the latest defect management information, the latest defect management information recorded in the latest used one of the plurality of defect management areas that is a defect management area prior to the last defect management area, including the last defect management area, and that is reproducible the defect management information when the unused defect management area is not detected.

12. The method as claimed in claim 1, wherein said searching step (b) includes the step of (b3) back-searching for said currently active defect management area to opposite in direction to in the order of using the defect management areas when a searching start area is unused.

13. The method as claimed in claim 12, wherein said back-searching step (b3) comprises the step of searching back to opposite in direction to in the order of using the defect management areas for used defect management areas.

14. The method as claimed in claim 13, wherein said searching step (b) further comprises the step of selecting, as the latest defect management information, the defect management information recorded in one of said used defect management areas that is first detected.

15. The method as claimed in claim 13, wherein said searching step (b) further comprises the step of deciding that the defect management information is not obtained when any used defect management areas are not detected.

16. The method as claimed in claim 12, wherein said back-searching step (b3) comprises the step of searching back to opposite in direction to in the order of using the defect management areas for used reproducible defect management areas each of which is reproducible the defect management information.

17. The method as claimed in claim 16, wherein said searching step (b) further comprises the step of selecting, as the latest defect management information, the defect management information recorded in one of the used reproducible defect management areas that is first detected.

18. The method as claimed in claim 16, wherein said searching step (b) further comprises the step of deciding that defect management information is not obtained when any used reproducible defect management areas are not detected.

19. At least one of a recording and a reproducing apparatus for performing at least one of recording and reproducing data in or from an information recording medium, said information recording medium comprising a user area for storing user data, a plurality of defect management areas each of which enables to record defect management information on said user area, and a plurality of selection information areas each of which enables to record selection information including location information indicative of a location of a currently active defect management area in which the latest defect management information is recorded, said apparatus comprising:

(a) selecting means for selecting the latest selection information by searching said plurality of selection information areas for a currently active selection area in which the latest selection information is recorded; and (b) searching means for searching, on the basis of the latest selection information, said plurality of defect management areas for the currently active defect management area.

20. The apparatus as claimed in claim 19, wherein said selecting means (a) selects, as the latest selection information, the selection information recorded in the latest used one of the selection information areas where the selection information can normally be reproduced.

21. The apparatus as claimed in claim 19, wherein said searching means (b) staffs searching for said currently active defect management area by using, as a searching start area.

22. The apparatus as claimed in claim 21, wherein said searching start area in the defect management areas is indicated by said latest selection information.

23. The apparatus as claimed in claim 19, said apparatus further comprising:

using means for using alternatively one of alternative defect management areas when a currently active defect management area in which the latest defect management information is recorded cannot normally store the defect management information, and searching means for searching start area in which the defect management areas should be used first.

24. The apparatus as claimed in claim 19, wherein said searching means includes forward-searching means for forward-searching sequentially the plurality of defect management areas along in the order in which the plurality of defect management areas should be used when a searching staff area is not unused.

25. The apparatus as claimed in claim 24, wherein said forward-searching means searches the plurality of defect management areas along in the order in which the plurality of defect management areas should be used for an unused defect management area.

26. The apparatus as claimed in claim 25, wherein said forward-searching means selects, as the latest defect management information, the defect management information recorded in a used defect management area immediately before the unused defect management area which is first detected.

27. The apparatus as claimed in claim 25, wherein said forward-searching means selects, as the latest defect management information, the defect management information recorded in the latest used one of used defect management areas, in which the defect management information can be reproduced, immediately before the unused defect management area which is first detected.

28. The apparatus as claimed in claim 25, wherein said forward-searching means selects, as the latest defect management information, the defect management information recorded in the last one of the plurality of defect management areas that should be last used when the unused defect management area is not detected.

29. The apparatus as claimed in claim 25, wherein said forward-searching means selects, as the latest defect management information, the latest defect management information recorded in the latest used one of the plurality of defect management areas that is a defect management area prior to the last defect management area, including the last defect management area, and that is reproducible the defect management information when the unused defect management area is not detected.

30. The apparatus as claimed in claim 19, wherein said searching means (b) includes back-searching means for back-searching for said currently active defect management area to opposite in direction to in the order of using the defect management areas when a searching start area is unused.

31. The apparatus as claimed in claim 30, wherein said back-searching means searches back to opposite in direction to in the order of using the defect management areas for used defect management areas.

32. The apparatus as claimed in claim 31, wherein said searching means (b) further selects, as the latest defect management information, the defect management information recorded in one of said used defect management areas that is first detected.

33. The apparatus as claimed in claim 31, wherein said searching means (b) further decides that the defect management information is not obtained when any used defect management areas are not detected.

34. The apparatus as claimed in claim 30, wherein said back-searching means searches back to opposite in direction to in the order of using the defect management areas for used reproducible defect management areas each of which is reproducible the defect management information.

35. The apparatus as claimed in claim 34, wherein said searching means (b) further selects, as the latest defect management information, the defect management information recorded in one of the used reproducible defect management areas that is first detected.

36. The apparatus as claimed in claim 34, wherein said searching means (b) further decides that defect management information is not obtained when any used reproducible defect management areas are not detected.

37. A reproducing apparatus for reproducing data from an information recording medium, said information recording medium comprising a user area for storing user data, a plurality of defect management areas each of which enables to record defect management information on said user area, and a plurality of selection information areas each of which enables to record selection information including location information indicative of a location of a currently active defect management area in which the latest defect management information is recorded, said apparatus comprising:
  (a) selecting means for selecting the latest selection information by searching said plurality of selection information areas for a currently active selection area in which the latest selection information is recorded; and
  (b) searching means for searching, on the basis of the latest selection information, said plurality of defect management areas for the currently active defect management area.

38. The apparatus as claimed in claim 37, wherein said selecting means (a) selects, as the latest selection information, the selection information recorded in the latest used one of the selection information areas where the selection information can normally be reproduced.

39. The apparatus as claimed in claim 37, wherein said searching means (b) staffs searching for said currently active defect management area by using, as a searching start area.

40. The apparatus as claimed in claim 37, said apparatus further comprising:
  using means for using alternatively one of alternative defect management areas when a currently active defect management area in which the latest defect management information is recorded cannot normally store the defect management information, and
  searching means for searching start area in which the defect management areas should be used first.

41. The apparatus as claimed in claim 37, said apparatus further comprising:
  using means for using alternatively one of alternative defect management areas when a currently active defect management area in which the latest defect management information is recorded cannot normally store the defect management information, and
  forward-searching means for forward-searching sequentially the plurality of defect management areas along in the order in which the plurality of defect management areas should be used when a searching start area is not unused.

42. The apparatus as claimed in claim 41, wherein said forward-searching means searches the plurality of defect management areas along in the order in which the plurality of defect management areas should be used for an unused defect management area.

43. The apparatus as claimed in claim 42, wherein said forward-searching means selects, as the latest defect management information, the defect management information recorded in a used defect management area immediately before the unused defect management area which is first detected.

44. The apparatus as claimed in claim 42, wherein said forward-searching means selects, as the latest defect management information, the defect management information recorded in the latest used one of used defect management areas, in which the defect management information can be reproduced, immediately before the unused defect management area which is first detected.

45. The apparatus as claimed in claim 42, wherein said forward-searching means selects, as the latest defect management information, the defect management information recorded in the last one of the plurality of defect management areas that should be last used when the unused defect management area is not detected.

46. The apparatus as claimed in claim 42, wherein said forward-searching means selects, as the latest defect management information, the latest defect management information recorded in the latest used one of the plurality of defect management areas that is a defect management area prior to the last defect management area, including the last defect management area, and that is reproducible the defect management information when the unused defect management area is not detected.

47. The apparatus as claimed in claim 37, said apparatus further comprising:
  using means for using alternatively one of alternative defect management areas when a currently active defect management area in which the latest defect management information is recorded cannot normally store the defect management information, and
  back-searching means for back-searching for said currently active defect management to opposite in direction to in the order of using the defect management areas when a searching start area is unused.

48. The apparatus as claimed in claim 47, wherein said back-searching means searches back to opposite in direction to in the order of using the defect management areas for used defect management areas.

49. The apparatus as claimed in claim 48, wherein said searching means (b) further selects, as the latest defect management information, the defect management information recorded in one of said used defect management areas that is first detected.

50. The apparatus as claimed in claim 48, wherein said searching means (b) further decides that the defect management information is not obtained when any used defect management areas are not detected.

51. The apparatus as claimed in claim 47, wherein said back-searching means searches back to opposite in direction to in the order of using the defect management areas for used reproducible defect management areas each of which is reproducible the defect management information.

52. The apparatus as claimed in claim 51, wherein said searching means (b) further selects, as the latest defect management information, the defect management information recorded in one of the used reproducible defect management areas that is first detected.

53. The apparatus as claimed in claim 51, wherein said searching means (b) further decides that defect management information is not obtained when any used reproducible defect management areas are not detected.

* * * * *